United States Patent
Thrun et al.

(10) Patent No.: US 10,703,480 B1
(45) Date of Patent: *Jul. 7, 2020

(54) MODULAR PERSONAL TRANSPORTATION SYSTEM

(71) Applicant: Kitty Hawk Corporation, Mountain View, CA (US)

(72) Inventors: Sebastian Thrun, Los Altos Hills, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,157

(22) Filed: May 21, 2019

Related U.S. Application Data

(60) Provisional application No. 62/684,898, filed on Jun. 14, 2018.

(51) Int. Cl.
| | |
|---|---|
| *G05B 15/00* | (2006.01) |
| *B64D 5/00* | (2006.01) |
| *H01M 2/10* | (2006.01) |
| *B64F 1/36* | (2017.01) |
| *B64D 11/06* | (2006.01) |
| *B64C 29/00* | (2006.01) |
| *B64C 37/02* | (2006.01) |
| *H01M 10/44* | (2006.01) |
| *H01M 10/42* | (2006.01) |
| *B64D 27/24* | (2006.01) |

(52) U.S. Cl.
CPC ............ *B64D 5/00* (2013.01); *B64C 29/0091* (2013.01); *B64C 37/02* (2013.01); *B64D 11/06* (2013.01); *B64F 1/362* (2013.01); *H01M 2/1083* (2013.01); *B64D 27/24* (2013.01); *B64D 2221/00* (2013.01); *H01M 2/1077* (2013.01); *H01M 10/441* (2013.01); *H01M 2010/4271* (2013.01); *H01M 2220/20* (2013.01)

(58) Field of Classification Search
CPC ...... B60L 2200/10; B60L 53/14; B60L 53/30; B60L 53/80; B60L 58/12; B64C 2201/042; B64C 2201/066
See application file for complete search history.

(56) References Cited

U.S. PATENT DOCUMENTS

| | | |
|---|---|---|
| 5,883,496 A | 3/1999 | Esaki |
| 8,692,507 B2 | 4/2014 | Chen |
| 9,284,062 B2 | 3/2016 | Wang |
| 9,434,267 B2 | 9/2016 | Wang |
| 9,623,760 B2 | 4/2017 | Wang |
| 10,150,524 B2 | 12/2018 | Evans |

(Continued)

*Primary Examiner* — Zhipeng Wang
(74) *Attorney, Agent, or Firm* — Van Pelt, Yi & James LLP

(57) ABSTRACT

A vertical landing of an aircraft is performed using the first battery where the aircraft is unoccupied when the vertical landing is performed, the unoccupied aircraft includes the first battery, and the unoccupied aircraft excludes a second, removable battery. In response to detecting that the second, removable battery is detachably coupled to the aircraft, a power source for the aircraft is switched from the first battery to the second, removable battery. After switching the switch power source, a vertical takeoff of the aircraft is performed using the second, removable battery, wherein the aircraft is occupied when the vertical takeoff is performed.

18 Claims, 20 Drawing Sheets

(56) References Cited

U.S. PATENT DOCUMENTS

| | | |
|---|---|---|
| 10,183,741 B2 | 1/2019 | Roeseler |
| 10,207,805 B2 | 2/2019 | Evans |
| 10,286,925 B2 | 5/2019 | Evans |
| 2004/0201362 A1 | 10/2004 | Borrego Bel |
| 2008/0246285 A1 | 10/2008 | Asada |
| 2010/0318252 A1 | 12/2010 | Izumi |
| 2011/0025124 A1 | 2/2011 | Brabec |
| 2012/0041627 A1 | 2/2012 | Kelty |
| 2015/0353192 A1* | 12/2015 | Morrison ............... B64C 27/08 244/17.23 |
| 2016/0028263 A1 | 1/2016 | Yau |
| 2016/0039540 A1* | 2/2016 | Wang ..................... B64F 1/36 244/114 R |
| 2016/0200214 A1 | 7/2016 | Ishibashi |
| 2016/0200421 A1* | 7/2016 | Morrison ............... B64C 13/18 244/17.23 |
| 2016/0303990 A1* | 10/2016 | Penilla ................. G06Q 20/18 |
| 2016/0375779 A1* | 12/2016 | Wang ..................... B64F 1/36 701/2 |
| 2017/0001537 A1 | 1/2017 | Ahn |
| 2017/0043670 A1* | 2/2017 | Zenner ................. B60L 53/14 |
| 2017/0141589 A1 | 5/2017 | Inoue |
| 2017/0217317 A1* | 8/2017 | Khusravsho ........... B60K 1/04 |
| 2018/0252774 A1 | 9/2018 | Ciaccio |

\* cited by examiner

MODULAR PERSONAL TRANSPORTATION SYSTEM

CROSS REFERENCE TO OTHER APPLICATIONS

This application claims priority to U.S. Provisional Patent Application No. 62/684,898 entitled MODULAR PERSONAL TRANSPORTATION SYSTEM filed Jun. 14, 2018 which is incorporated herein by reference for all purposes.

BACKGROUND OF THE INVENTION

In metropolitan areas like New York City and the San Francisco Bay Area, traffic congestion on the freeways is only getting worse. Mass transit in those regions is similarly packed. New transportation solutions which permit people to more quickly and easily get from place to place within a city would be desirable.

BRIEF DESCRIPTION OF THE DRAWINGS

Various embodiments of the invention are disclosed in the following detailed description and the accompanying drawings.

DETAILED DESCRIPTION

Figure 1A:
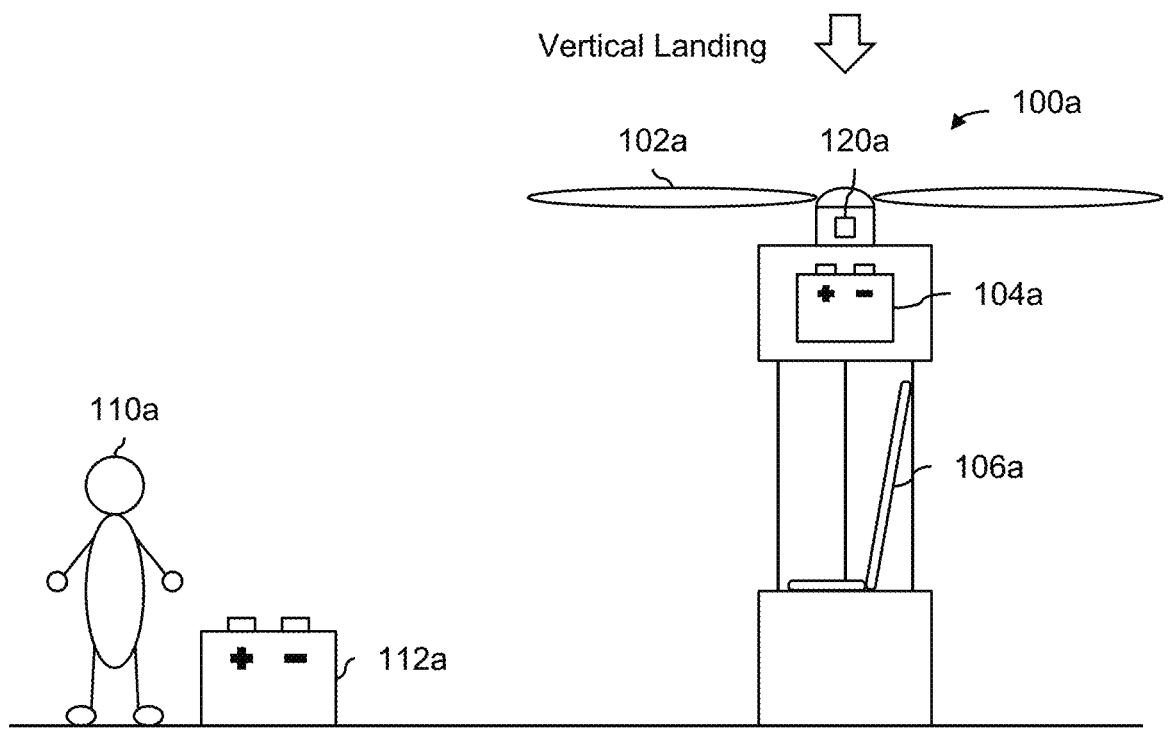
FIG. 1A is a diagram illustrating an embodiment of a personal transportation system before an occupant has entered the aircraft and a second battery has been coupled to the aircraft.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a personal transportation system are described herein. In some embodiments, the personal transportation system is an aircraft which performs a vertical landing of an aircraft using a first battery where the aircraft is unoccupied when the vertical landing is performed. In some embodiments, the first battery is an internal battery (e.g., that is not easily removable and/or swappable). In some other embodiments, the first battery is (also) a removable battery (e.g., the first, removable battery is swapped out and the second, removable battery is swapped in). The second, removable battery being detachably coupled to the aircraft is detected. In response to detecting the second, removable battery being detachably coupled to the aircraft, a power source for the aircraft is switched from the first battery to the second, removable battery and after switching the switch power source, a vertical takeoff of the aircraft is performed using the second, removable battery, wherein the aircraft is occupied when the vertical takeoff is performed. The following figures describe some examples of a personal transportation system and how it may be used to transport an occupant.

FIG. 1A is a diagram illustrating an embodiment of a personal transportation system before an occupant has entered the aircraft and a second battery has been coupled to the aircraft. In the example shown, the aircraft (100a) is an unoccupied aircraft which has flown to the pickup location shown and performed a vertical landing. For example, as will be described in more detail below, the occupant (110a) may have requested a ride from some flight service provider and the unoccupied aircraft (100a) is dispatched to pick up the occupant.

In this example, the unoccupied aircraft (100a) is a relatively lightweight aircraft which includes an exemplary propeller or rotor (102a) which rotates about a vertical axis of rotation. In other words, the aircraft is a vertical takeoff and landing (VTOL) aircraft. Although not shown here, in some embodiments, the aircraft includes wings so that the aircraft can perform (at least partially) wing-borne flight (e.g., which is more efficient). For simplicity and ease of explanation, some features which are not directly related to the technique are not necessarily described herein. For example, a single rotor oriented to rotate about a vertical axis of rotation (as shown here) will typically have an anti-torque rotor. For simplicity and ease of explanation, such a rotor is not shown or described herein. In some embodiments, the aircraft (100a) has rotors which rotate about a longitudinal axis (e.g., rotors in a fixed position which can be turned off/on when desired, or rotors which can change position or direction because they are tilt rotors or they are rotors that are attached to a tilt wing). Any appropriate aircraft which is capable of performing a vertical takeoff and/or landing may be used.

An internal (e.g., built in and/or not easily removable and/or swappable) battery (104a) in the aircraft is used to power the rotor and other devices which require power when flying to the pickup location shown here (e.g., sensors in the aircraft, actuators for control surfaces on the aircraft, electronics in the aircraft, etc.). In some embodiments, a charger and/or depot from which the unoccupied aircraft flies to the pickup location is located only a short distance away. Since the internal battery (104a/104b) only needs to power the aircraft for a short hop, this simplifies and/or reduces the amount, complexity, and/or weight of onboard power equipment (e.g., to quickly charge/discharge the internal battery) that otherwise could be a large burden on the exemplary vehicle.

At the pickup location, an occupant (110a) with a second battery (112a) is waiting. In this example, the second (e.g., removable and/or portable) battery (112a) has a larger capacity than the first battery (104a) which was used to fly the unoccupied aircraft to the pickup location shown. The occupant inserts or otherwise couples (e.g., electronically and physically) the removable battery (112a) to the unoccupied aircraft and then gets into the seat (106a). In some embodiments, the insertion of the battery is detected and this state information is passed to a (flight) controller (120a) which responds accordingly (e.g., switches power sources so that the vehicle runs off of the inserted removable battery).

The following figure shows the system after the removable battery has been coupled to the aircraft and after the occupant has entered the aircraft.

Figure 1B:
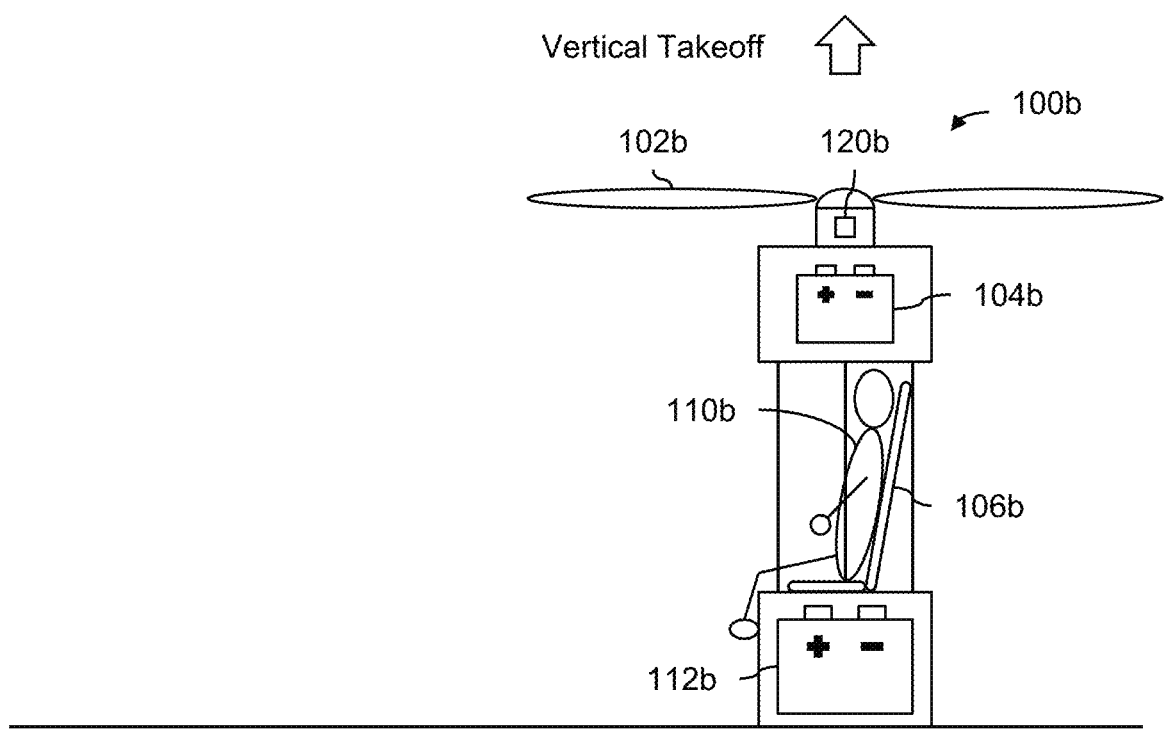
FIG. 1B is a diagram illustrating an embodiment of a personal transportation system after an occupant has entered the aircraft and a second battery has been coupled to the aircraft.

FIG. 1B is a diagram illustrating an embodiment of a personal transportation system after an occupant has entered the aircraft and a second battery has been coupled to the aircraft. In the state shown, the second battery (112b), which the occupant (110b) brought with them, is now inserted into and/or otherwise coupled to the multicopter and the occupant (110b) is now seated in the seat (106b). In some embodiments, the occupant is mostly or entirely a passenger (e.g., the occupied aircraft (100b) is mostly or completely autonomous). Alternatively, in some embodiments, the occupant pilots the aircraft to the destination.

Once the second battery (112b) is coupled to the aircraft and the occupant is ready to take off, the now occupied multicopter (100b) performs a vertical takeoff using the rotor (102b). However, unlike the landing shown in FIG. 1A (e.g., where power was supplied by the first battery 104a), the power for the takeoff is now supplied by the second, removable battery (112b). In this example, all of the power required to fly the occupied aircraft (100b) is provided by the removable battery (112b) and no charge or power is drawn from the internal battery (104b) (e.g., assuming that the removable battery (112b) has sufficient power). In some embodiments, this switch of power sources is controlled and/or initiated by the controller (120b).

In some embodiments, in addition to providing the power to fly the occupied aircraft (100b) from the pickup location to the drop off location, the first battery (in this example, an internal or built-in battery) 104b is charged from the removable battery (112b) during transport of the occupant.

In this example, the seat is an open-air seat with no windshield or enclosure. In ultra-light applications, this may be desirable since a windshield or other enclosure would add weight to the aircraft (both when unoccupied (100a) as well as when occupied (100b)). Alternatively, in some embodiments, there is some lightweight windshield, guard, or other protective features around the seat (106a/106b), for example, to protect the occupant from the wind and/or rain. For example, there may be vinyl, see-through sides surrounding the four sides of the seat where the front side can be pushed aside or rolled up for ingress and egress.

In some embodiments, protective sides or panels are removable or otherwise detachable (e.g., when the weather is warmer and/or nicer). Having removable sides or panels would permit slightly heavier sides or panels (e.g., which might offer better thermal insulation and/or protection from the wind, rain, and/or snow) to be used during bad weather and removed (e.g., which makes power consumption more efficient) when the weather is good. In some embodiments (not shown here), a seat or cockpit includes safety device(s) to secure or otherwise restrain the occupant. For example, seat $106a/106b$ may include shoulder and/or lap belts, a five point harness, or other straps to secure the occupant.

In this example, the second, removable battery ($112b$) is inserted into a space or compartment below the seat ($106b$) because this is a convenient location (e.g., it permits a flat surface for the multicopter to land on, the space was already there due to the shape of the seat, and it does not require the occupant to lift the removable battery above their head). In some other embodiments (e.g., described below), a second, removable battery is inserted into or otherwise attached to the aircraft at some other location or position.

Generally speaking, the unoccupied aircraft ($100a$) in FIG. 1A (i.e., without the occupant ($110a$) and without the removable battery ($112a$)) is designed to be a relatively small fraction of the mass or weight compared to the occupied aircraft ($100b$) in FIG. 1B (i.e., with the occupant ($110b$) and with the removable battery ($112b$)). For example, the weight of the unoccupied aircraft ($100a$) may be 50-70% or less of the weight of the occupied aircraft ($100b$). This enables the built-in battery ($104a$) to have a relatively small capacity since it is only used when the aircraft is unoccupied. The removable battery ($112a/112b$) has a larger capacity than the built-in battery ($104a/104b$) because it will need to fly the aircraft when it is occupied and thus much heavier.

The aircraft shown in FIG. 1A and FIG. 1B is merely exemplary and other embodiments may have other features and/or be configured differently. The following figures show an example of an aircraft where the occupant stands.

Figure 2A:
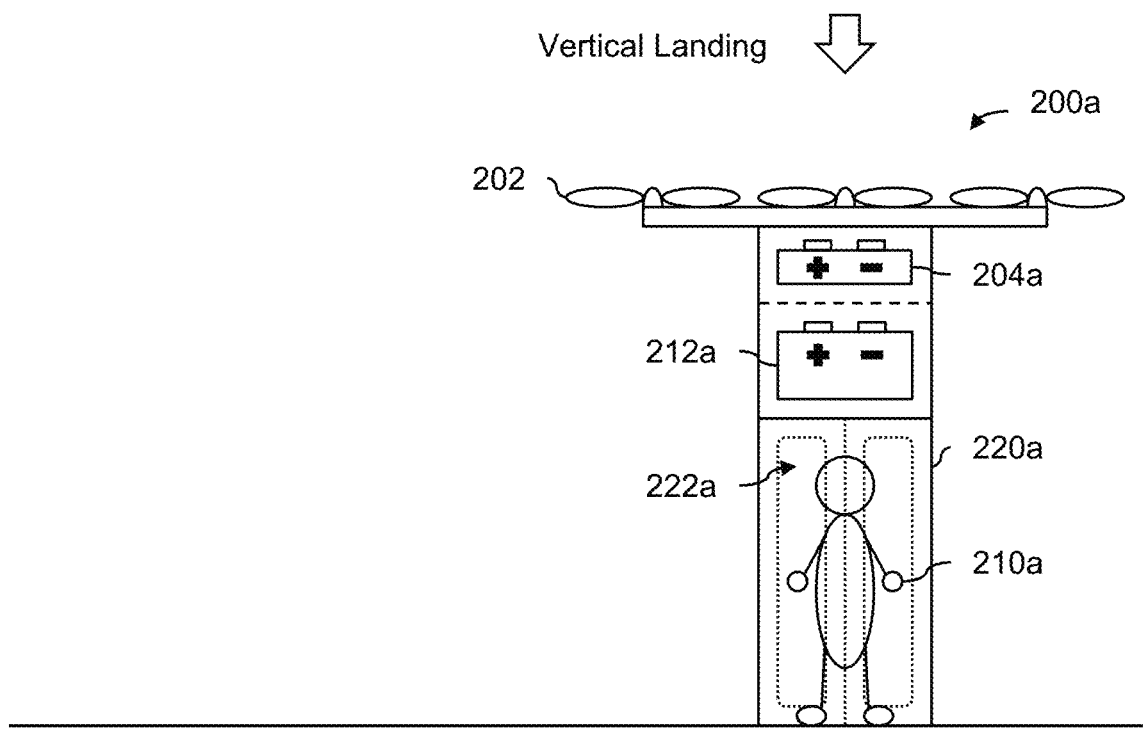
FIG. 2A is a diagram illustrating an embodiment of an occupied, standing personal transportation system.

FIG. 2A is a diagram illustrating an embodiment of an occupied, standing personal transportation system. In the example shown, occupied aircraft $200a$ has performed a vertical landing. In this example, the aircraft is a multicopter with multiple rotors ($202$) which rotate about a vertical axis which permits the aircraft to perform vertical takeoffs and landings. To preserve the readability of this figure, a controller is not shown in this example but various management and/or control operations (e.g., switching power sources in response to removal of the removable battery) is done by a controller.

Unlike the previous example, in this example, both the internal battery ($204a$) and the removable battery ($212a$) are both located above the occupant's head, near the rotors and other devices which require power. For example, with the removable battery ($212a$) located closer to the power loads, less electrical wiring needs to be routed. In contrast, in FIG. 1B, there would be electrical wiring from the top of the aircraft (e.g., near internal battery $104b$) to the bottom of the seat ($106b$) so that the removable battery ($112b$) which is beneath the seat can be electrically connected to the other electrical devices.

In this example, the internal battery ($204a$) and the removable battery ($212a$) are stacked vertically with the removable battery located below the internal battery and above the compartment ($220a$). In some applications this is desirable because then the occupant does not have to lift the battery as high and/or a shorter occupant will have an easier time getting the removable battery in and out. For example, if the two batteries were arranged vertically but the removable battery was on top, then the occupant would have to lift the battery higher and a shorter occupant would find this more difficult.

Another difference compared to the previous example is how the aircraft carries the occupant. In this example, the occupant ($210a$) stands during the ride in a compartment ($220a$). The exemplary compartment has an accordion-style door ($222a$) for the occupant to get in and out. In other words, the compartment resembles a telephone booth. This type of compartment may be attractive because it more easily permits the occupant to bring luggage on board the aircraft and it permits occupants in wheelchairs to use the aircraft.

In some embodiments, the compartment may include safety features to prevent the occupant from falling. For example, the compartment may include straps or bars for the occupant to hold on to during the ride. In some embodiments, the compartment includes a folding and/or jump seat (e.g., with or without seatbelts, a harness, etc.).

Figure 2B:
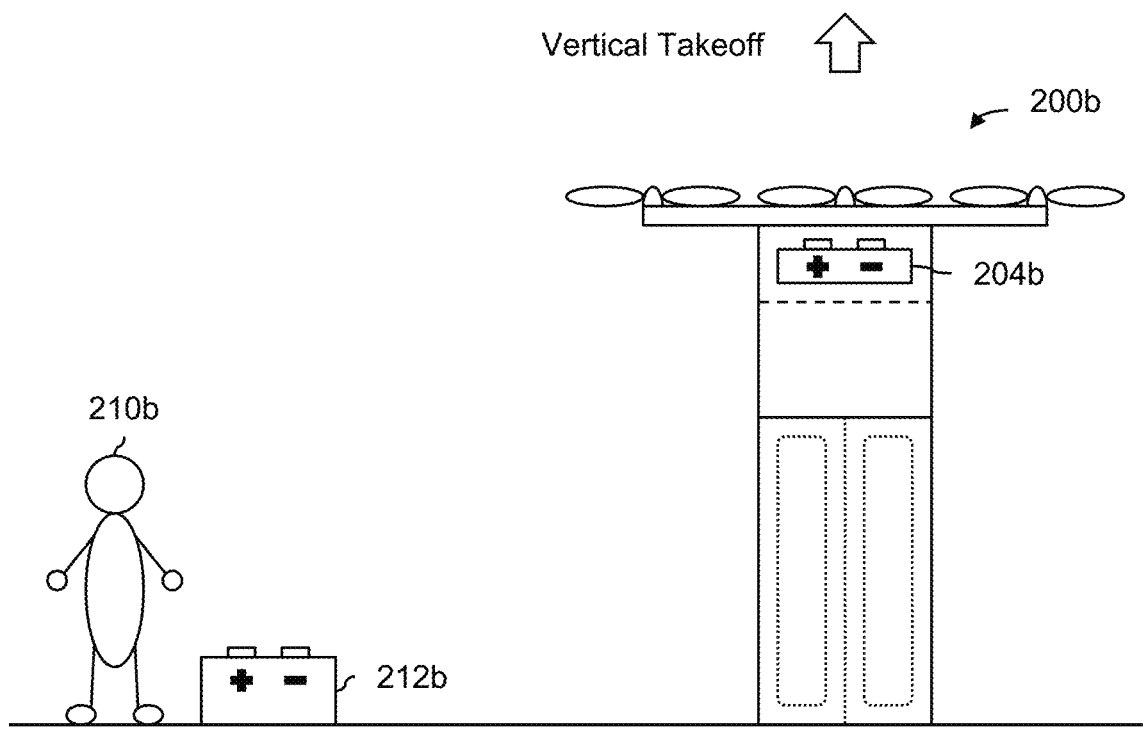
FIG. 2B is a diagram illustrating an embodiment of an unoccupied, standing personal transportation system.

The aircraft embodiments described above include a seat (e.g., for the occupant to sit in, FIGS. 1A and 1B) and a compartment (e.g., for the occupant to stand it, FIGS. 2A and 2B). Any appropriate device or compartment may be used to hold or otherwise transport the occupant, including a cockpit, a bicycle-style seat, a backless seat, a saddle, etc. In some embodiments, cargo is transported (e.g., in addition to and/or as an alternative to a passenger or occupant).

FIG. 2B is a diagram illustrating an embodiment of an unoccupied, standing personal transportation system. In the state shown, the occupant ($210b$) has exited the aircraft ($200b$) and has taken the removable battery ($212b$) out. The unoccupied aircraft ($200b$) then takes off vertically using the internal battery ($204b$).

In some embodiments, the exemplary aircraft described above are part of a transportation service which provides flights to people who request them. The following figure shows an example of this.

Figure 3:
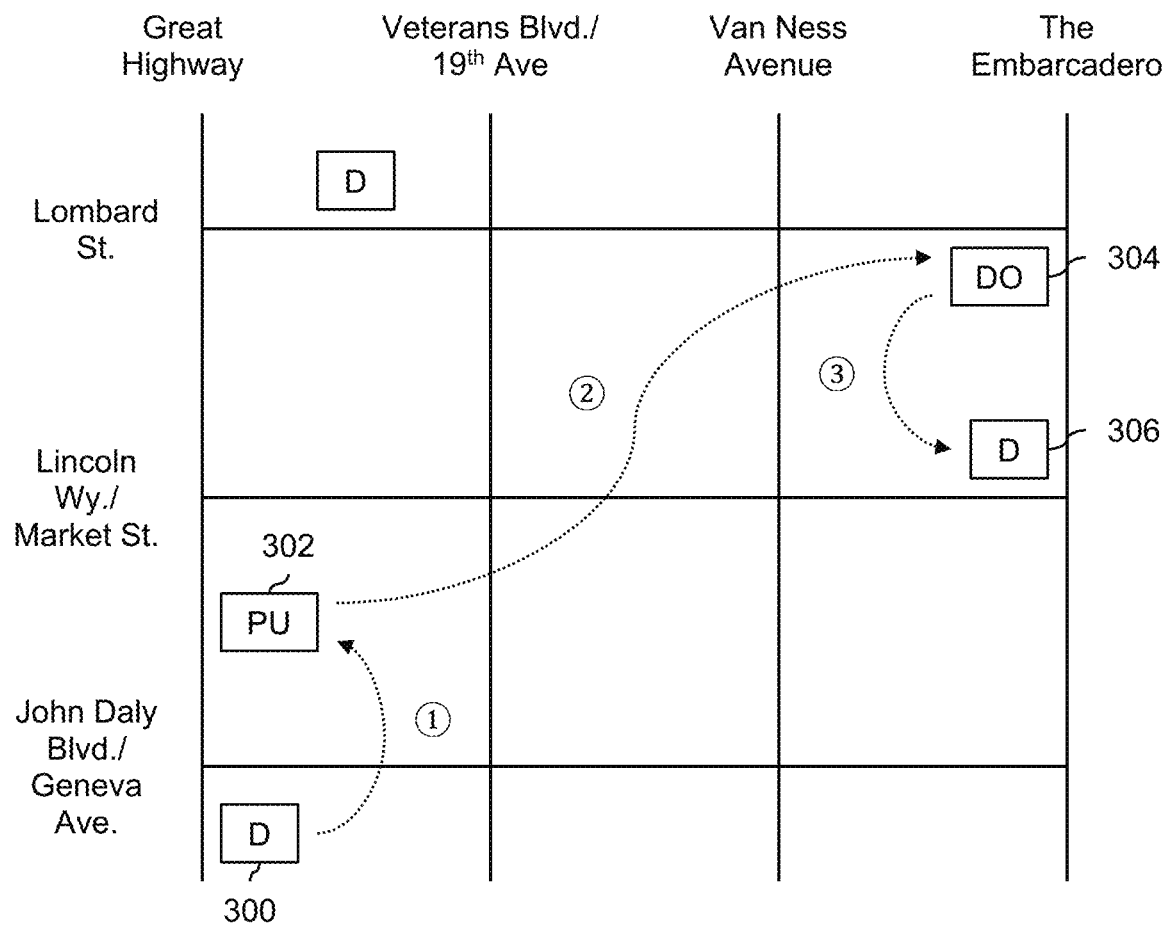
FIG. 3 is a diagram illustrating an embodiment of a map with locations associated with a flight service provider.

FIG. 3 is a diagram illustrating an embodiment of a map with locations associated with a flight service provider. In this example, an occupant (not shown) has requested a flight to work. An unoccupied aircraft (see, e.g., unoccupied aircraft $100a$ in FIG. 1A and unoccupied aircraft $200b$ in FIG. 2B) is sent from a source depot ($300$) to the occupant's house (i.e., the pickup location) ($302$). In this example, depots are locations where unoccupied aircraft (such as the one shown in FIG. 1A) can charge and/or wait for their next assignment. An unmanned aircraft is selected from depot $300$ (as opposed to other depots) because that is the depot located closest to the pickup location ($302$). At the pickup location ($302$), the unoccupied aircraft lands vertically. Landing vertically is attractive or otherwise desirable, because the aircraft has a smaller landing footprint compared to an aircraft which performs a traditional (e.g., wing-borne) landing and can land in more densely-packed areas (e.g., San Francisco, as shown in this example). As described above, during this first leg, the unoccupied aircraft has power using the internal battery.

At the pickup location ($302$), the occupant, with their removable battery inserted into and/or otherwise attached to the aircraft, is then flown from the pickup location ($302$) to the drop off location ($304$), which in this example is the occupant's office. As described above, this second leg is powered using the removable battery (see, e.g., FIG. 1B) and in some embodiments, the internal battery is charged off of the removable battery.

It is noted the aircraft embodiments described herein are independent and/or agnostic with respect to the flying technology and/or technique used to fly the occupied aircraft. To put it another way, in some embodiments, autonomous flying techniques and/or processes are used to fly the occupied aircraft from the pickup location (302) to the drop off location (304) (i.e., the occupant is strictly an occupant and does not have to fly or otherwise instruct the aircraft). Alternatively, the occupant may also be a pilot who flies or otherwise instructs the aircraft (e.g., even if the aircraft is at least semi-autonomous).

At the drop off location (304), the occupant gets off and takes their removable battery with them. See, for example, FIG. 2A and FIG. 2B. At work, the occupant charges the removable battery (not shown), which has been at least partially depleted of charge or power during the flight from home (302) to work (304). Meanwhile, the aircraft (which is unoccupied once again) flies from the drop off location (304) to a destination depot (306) where the internal battery is charged and/or the aircraft awaits its next assignment. During this third leg, the internal battery is used to power the unoccupied aircraft. See, for example FIG. 2B.

At the end of the day (e.g., when the removable battery has had many hours to charge), the occupant requests a flight home and the sequence is reversed (not shown). Once home for the night, the occupant will charge their removable battery overnight at their home so that it is fully charged for the next morning's flight (if needed).

Alternatively, in some embodiments, the removable battery stays at or near the drop off location (e.g., 304) and the removable battery is charged there. For example, there may be designated pickup and drop off locations and the occupant or attendant may leave the battery in some charging locker or array of chargers at the designated pickup and drop off location where it will remain until collected. In some embodiments, each battery has an owner or assigned or designated user (e.g., so that the same user tends to use to the same battery). Alternatively, the batteries may not be designated for or assigned to a particular user and are selected or otherwise used on a first come, first serve basis.

One benefit to this type of aircraft is that it can be used to quickly transport people, even in dense cities with traffic congestion. For example, driving from the western side of San Francisco to the eastern side of San Francisco can take anywhere from 30 minutes to an hour, depending upon traffic. The ability to take off and land vertically permits this type of aircraft to be used even in dense cities with little free space (e.g., there is no need for a long runway which a conventional takeoff and landing aircraft would require). Once airborne, flying avoids all of the traffic congestion on the ground, and permits the occupant to get from one location to another quickly and easily.

In some embodiments, a depot (e.g., 300 or 306) or designated landing site (e.g., 302 or 304) is/are located on the roof of a building. For example, using the roof of a building may be attractive for a number of reasons. From a noise perspective, it may be less noisy if an aircraft stays higher up and does not come down to the ground level. Also, using rooftops may be safer during takeoff and landing because the area may be more controllable and/or better secured with fewer passersby. In densely crowded areas, there may also be fewer locations on the ground with enough clear space necessary for takeoff and landing; rooftops may offer some of the last securable and flat space available in such areas.

In some embodiments, a removable battery stays at a landing site (e.g., where the occupant gets out of the personal transportation system) and the removable battery is charged at the landing site (e.g., instead of at the occupant's house or place of work). In some embodiments where the landing site is located on the roof of a building, solar panels or other renewable sources of energy are used to charge the removable batteries being charged there.

The following flowcharts describe the examples of FIGS. 1A-2B more generally and/or formally.

Figure 4:
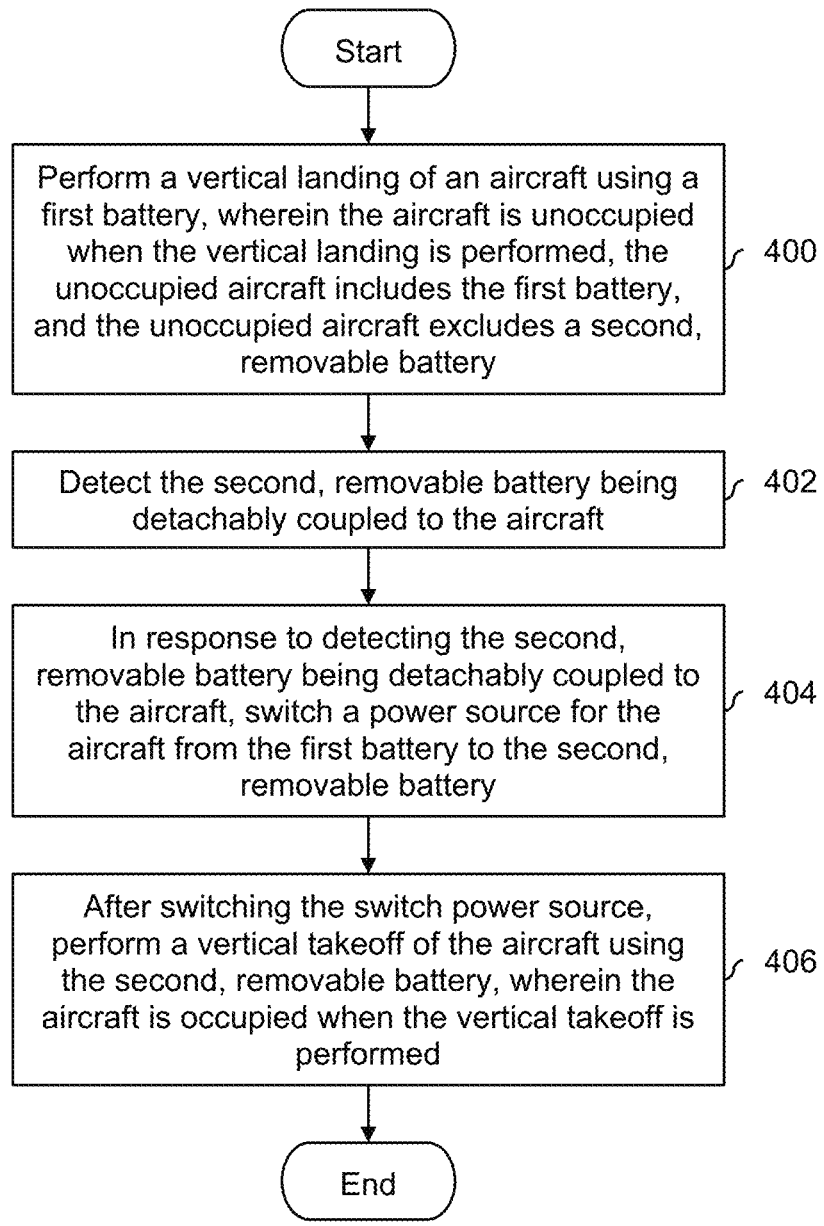
FIG. 4 is a flowchart illustrating an embodiment of a process to switch from an internal battery as a power source to a removable battery.

FIG. 4 is a flowchart illustrating an embodiment of a process to switch from an internal battery as a power source to a removable battery. In some embodiments, the process is performed by a controller (e.g., a flight controller) in personal transportation system 100a and 100b in FIG. 1A and FIG. 1B (e.g., when an occupant boards a personal transportation system and inserts or otherwise couples their removable battery to the personal transportation system).

At 400, a vertical landing of an aircraft is performed using a first battery, wherein the aircraft is unoccupied when the vertical landing is performed, the unoccupied aircraft includes the first battery, and the unoccupied aircraft excludes a second, removable battery. See, for example, the vertical landing performed by unoccupied aircraft 100a in FIG. 1A. The removable battery (112a) is not connected or otherwise coupled to the unoccupied aircraft (100a) so the internal battery (104a) supplies the power for the vertical landing.

At 402, the second, removable battery being detachably coupled to the aircraft is detected. That is, the removable battery is coupled to the aircraft in a manner where the two can subsequently be decoupled or detached from each other, and (e.g., temporary) coupling or a connection between the removable battery and aircraft is detected (e.g., mechanically and/or electrically). For example, going from FIG. 1A to FIG. 1B, removable battery 112b is now coupled (e.g., removably and/or temporarily) to aircraft 100b in FIG. 1B. Any appropriate (e.g., physical and/or electrical) technique and/or components to detect the coupling of the removable battery to or with the aircraft may be used.

At 404, in response to detecting the second, removable battery being detachably coupled to the aircraft, a power source for the aircraft is switched from the first battery to the second, removable battery. For example, although not shown in FIG. 1A and FIG. 1B (e.g., to preserve readability), aircraft 100a/100b may include electrical components which select the power source(s) for rotor 102a/102b and other components which require power. In FIG. 1A, since internal battery 104a is the only power source available, that battery is selected as the power source. In FIG. 1B, to conserve the power in internal battery 104b and since removable battery 112b is now available to the aircraft, removable battery 112b is selected as the power source.

At 406, after switching the switch power source, a vertical takeoff of the aircraft is performed using the second, removable battery, wherein the aircraft is occupied when the vertical takeoff is performed. See, for example, FIG. 1B, where removable battery 112b is used to power the vertical takeoff and internal batter 104b is not used to power the vertical takeoff.

Figure 5:
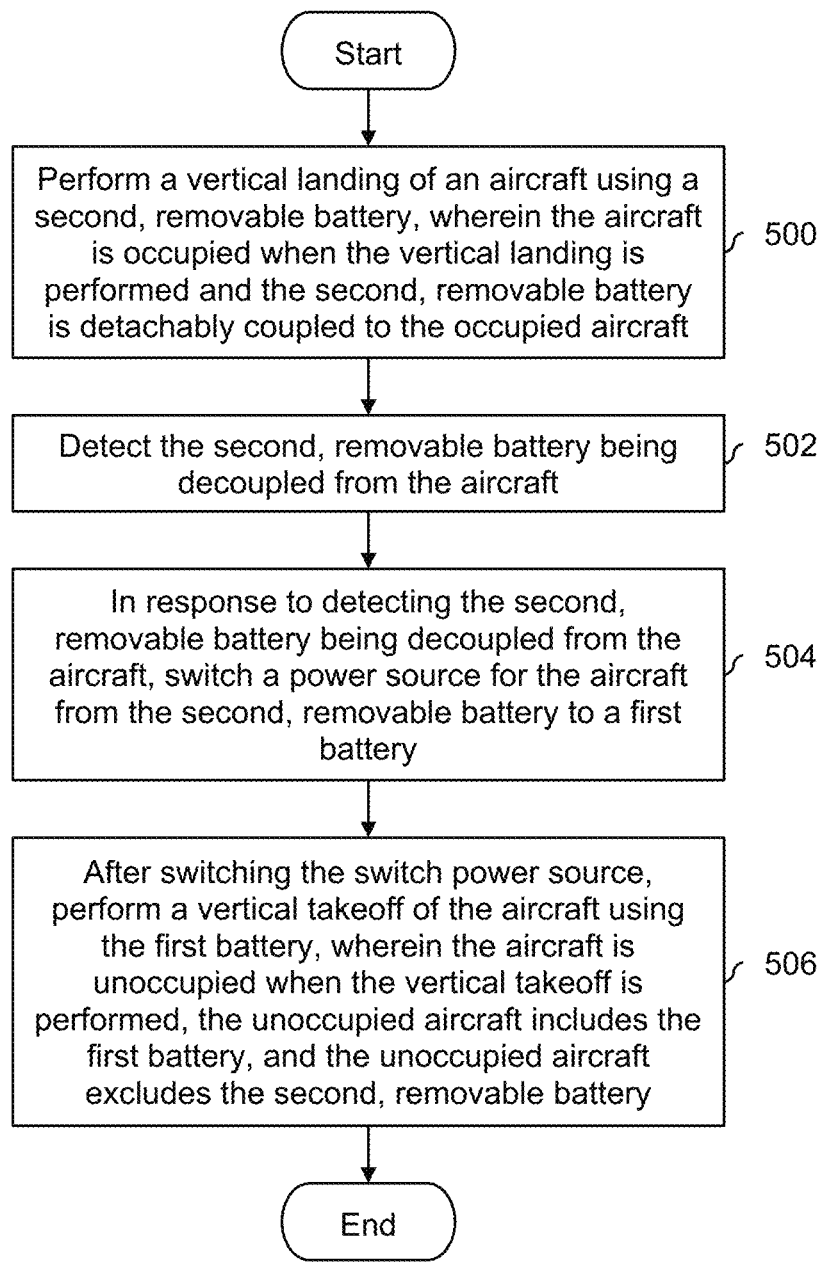
FIG. 5 is a flowchart illustrating an embodiment of a process to switch from a removable battery as a power source to an internal battery.

FIG. 5 is a flowchart illustrating an embodiment of a process to switch from a removable battery as a power source to an internal battery. In some embodiments, the process is performed by a controller (e.g., a flight controller)

in personal transportation system 200a and 200b in FIG. 2A and FIG. 2B (e.g., when an occupant disembarks from a personal transportation system and removes or otherwise decouples their removable battery from the personal transportation system).

At 500, a vertical landing of an aircraft is performed using a second, removable battery, wherein the aircraft is occupied when the vertical landing is performed and the second, removable battery is detachably coupled to the occupied aircraft. For example, to conserve the power of internal battery 204a, only removable battery 212a is used to perform the vertical landing in FIG. 2A.

At 502, the second, removable battery being decoupled from the aircraft is detected. See, for example, the transition from FIG. 2A to FIG. 2B. The occupant exits the aircraft and takes out or otherwise decouples removable battery 212b from aircraft 200b. As described above, any appropriate (e.g., physical and/or electrical) technique and/or components to detect the removal or decoupling of the removable battery from the aircraft may be used.

At 504, in response to detecting the second, removable battery being decoupled from the aircraft, a power source for the aircraft is switched from the second, removable battery to a first battery. See, for example, FIG. 2B. Since removable battery 212b is no longer available as a power source to unoccupied aircraft 200b, internal battery 204b is selected as the power source.

At 506, after switching the switch power source, a vertical takeoff of the aircraft is performed using the first battery, wherein the aircraft is unoccupied when the vertical takeoff is performed, the unoccupied aircraft includes the first battery, and the unoccupied aircraft excludes the second, removable battery. See, for example, the vertical takeoff shown in FIG. 2B.

In some embodiments, a device is used to help insert or remove a swappable battery from an aircraft. The following figure shows one example.

Figure 6A:
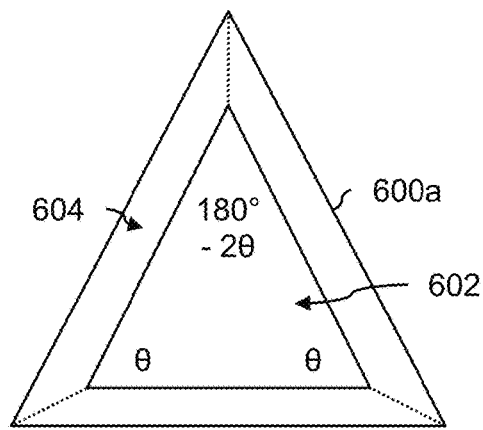
FIG. 6A is a diagram illustrating a top view of an embodiment of a docking station for an aircraft.

FIG. 6A is a diagram illustrating a top view of an embodiment of a docking station for an aircraft. In the example shown, the docking station (600a) has an isosceles triangle base (602) with inwardly sloping sides (604). An aircraft with a matching base is designed to perform a vertical landing and land in the docking station. The shape (in this example, an isosceles triangle but any appropriate shape may be used) enforces a single proper landing position for the aircraft (e.g., the shape of the docking station ensures that the aircraft always lands with the accordion-style door parallel to the shortest wall of the docking station). Enforcing a single proper landing position helps to ensure that any removable battery coupled to the aircraft can be safely detached from the aircraft and/or any new removable battery can be safely coupled to the aircraft.

The following figure shows a side view of an occupied aircraft landing in the exemplary docking station.

Figure 6B:
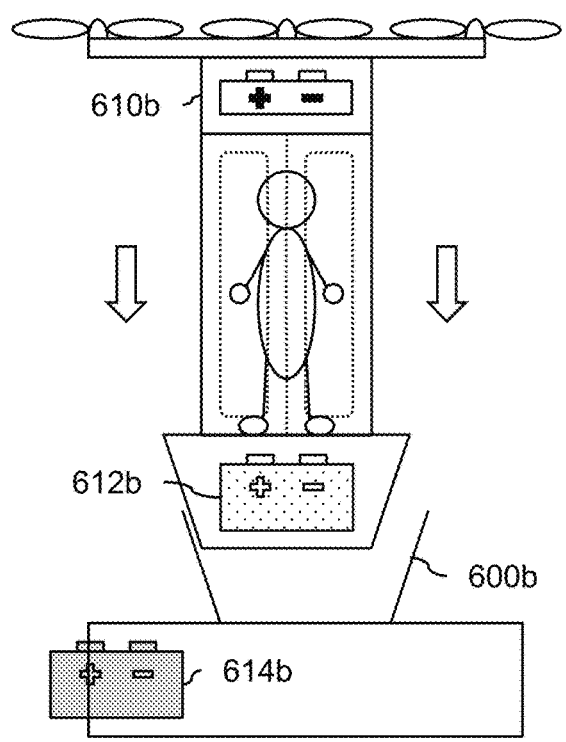
FIG. 6B is a diagram illustrating an embodiment of an aircraft performing a vertical landing into a docking station.

FIG. 6B is a diagram illustrating an embodiment of an aircraft performing a vertical landing into a docking station. In the example shown, the aircraft (610b) is performing a vertical landing into the docking station (600b). The aircraft (610b) is configured in this example to have a removable battery (612b) attached or otherwise coupled to the bottom of the aircraft. This permits the docking station to have access to the removable battery for removal (e.g., of an old one) and/or insertion (e.g., of a new one). In this example, the docking station (600b) is used to remove or otherwise decouple an old battery (612b) from the aircraft and insert or otherwise coupled a new battery (614b) to the aircraft.

As shown from this view, the sloped sides of the docking station help the aircraft to properly land in the docking station, even if the alignment is slightly off. In this example, the aircraft (610b) is slightly to the left of the docking station (600b). However, the inwardly sloping sides of the docking station will center the aircraft so that it lands properly and/or correctly within the docking station.

Figure 6C:
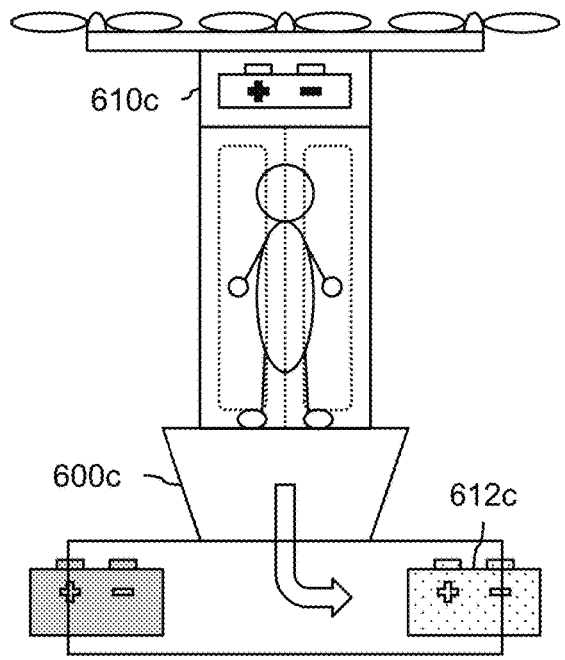
FIG. 6C is a diagram illustrating an embodiment of an aircraft in a docking station with an old removable battery removed.

FIG. 6C is a diagram illustrating an embodiment of an aircraft in a docking station with an old removable battery removed. In the example shown, the aircraft (610c) has landed in the docking station (600c) and has turned its rotors off so that it no longer needs power from the (old) removable battery (612c). Once it is safe to do so, the (old) removable battery (612c) in the aircraft is removed using the docking station (600c).

Figure 6D:
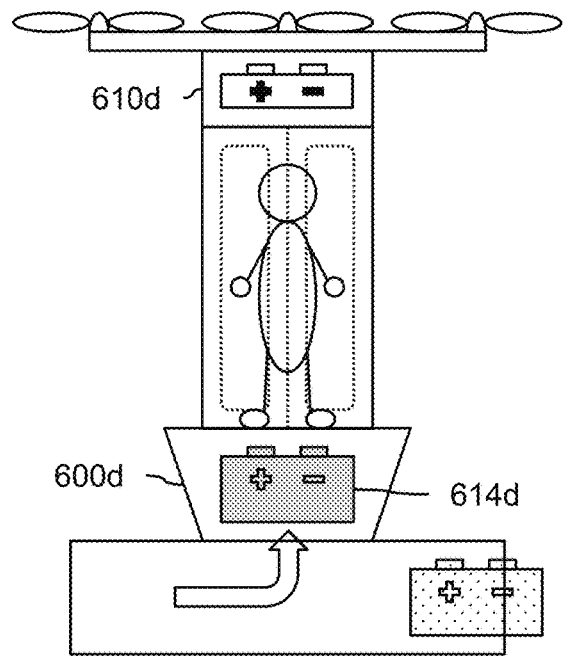
FIG. 6D is a diagram illustrating an embodiment of an aircraft in a docking station with a new removable battery inserted.

FIG. 6D is a diagram illustrating an embodiment of an aircraft in a docking station with a new removable battery inserted. In the example shown, the aircraft (610d) is still in the docking station (600d). The docking station (600d) has inserted the (new) removable battery (614d) into the aircraft (610d). Naturally, in some cases, only a removal or decoupling is performed, or only an insertion or coupling is performed. For completeness, both a decoupling and a coupling are shown in this example.

One benefit to using a docking station (one embodiment of which is shown here) to handle the removable battery is that the docking station may be able to more safely and/or gently decouple (e.g., remove) and/or couple (e.g., insert) removable batteries from/to the aircraft. For example, some people may misalign the batteries or push/pull too hard when inserting or removing the batteries, all of which could damage the battery and/or the aircraft. The risk of electric shock is also decreased if the docking station handles the battery. Another benefit is that a docking station may be faster at swapping out removable batteries compared to a human. For example, during peak times, a fast turnaround time may be desirable if there is a line for aircraft at a predetermined pickup/drop off location. The docking station also frees up an occupant so that they can focus on carrying in/out any luggage, helping young children, etc.

Figure 6E:
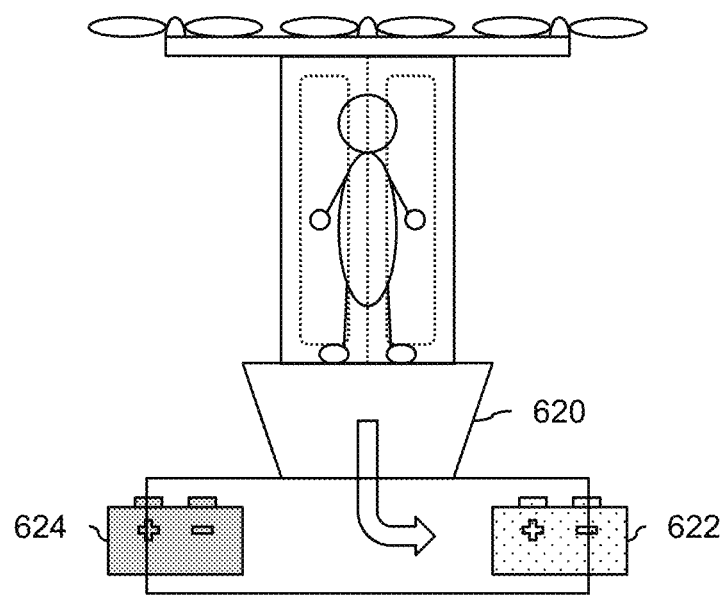
FIG. 6E is a diagram illustrating an embodiment of an aircraft in a docking station where all batteries are removable.

FIG. 6E is a diagram illustrating an embodiment of an aircraft in a docking station where all batteries are removable. In this example, the aircraft lands in docking station 620 using a first battery (622) which is removable (for brevity, the landing is not shown). Once in the docking station, the first battery (622) is swapped out, as is shown here. Then, a second battery (624), which is removable and fully charged, is swapped into the aircraft (not shown). The aircraft can then take off (not shown) using the second battery (624).

Such embodiments (e.g., where all of the batteries are removable) may be desirable because then expensive and/or heavy power components to charge and/or discharge an internal battery quickly do not need to be included in the aircraft. In contrast, if an internal battery had to fly the unoccupied aircraft to or from a depot or other location, then expensive and/or heavy power components would need to be included in the aircraft which adds to the expense and weight. As shown here, in some embodiments, the first battery which is used during a vertical landing In some applications, the occupant of an aircraft will transport the removable battery with them to their final destination and charge it there. As such, in some embodiments, a removable battery includes features to make transport and/or charging more convenient. The following figure shows some exemplary features which make transport of the removable battery easier.

Figure 7:
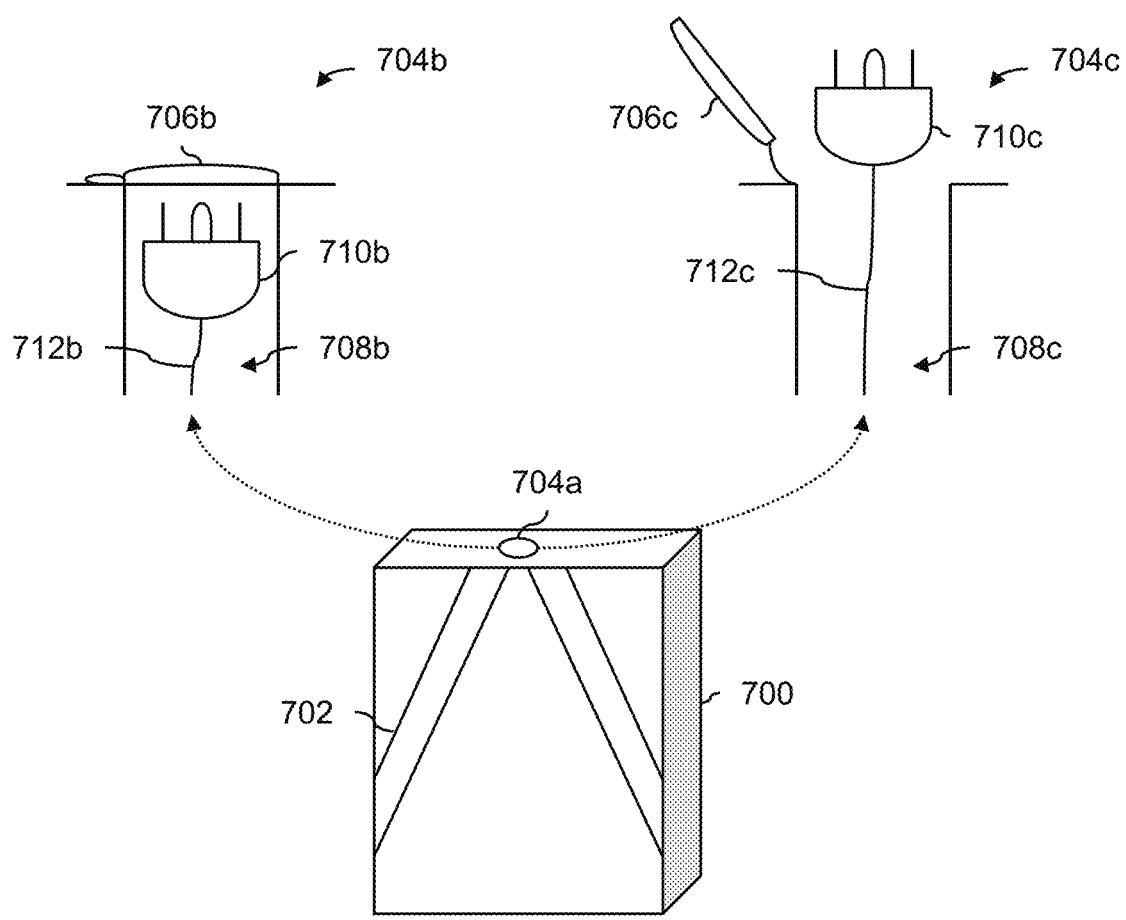
FIG. 7 is a diagram illustrating embodiments of a removable battery which is configured for easy transport.
Figure 7:
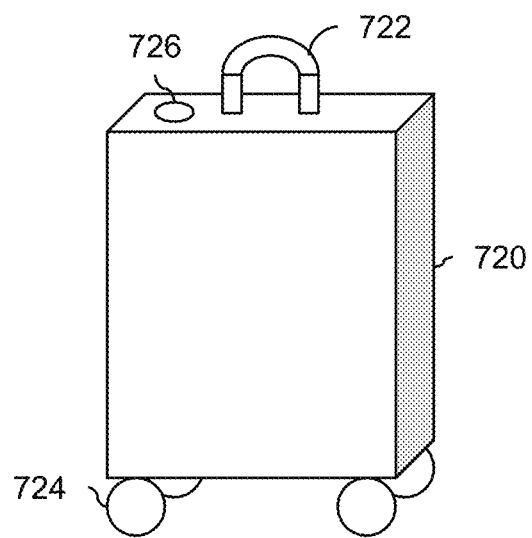

FIG. 7 is a diagram illustrating embodiments of a removable battery which is configured for easy transport. In the example shown, battery 700 has shoulder straps (702) which permit the removable battery to be carried like a backpack. Alternatively, a battery may have a single strap (not shown) so that the battery is carried across the body (e.g., like a messenger bag), over the shoulder (e.g., like a shoulder bag), or carried by hand (e.g., like a briefcase).

In some cases, a pickup location and/or drop off location may not be close to the occupant's actual location prior to pick up and/or desired (e.g., final) destination. For example, there may be designated and/or permitted locations at which a pickup or a drop off is permitted to occur (e.g., due to zoning restrictions). By including straps or other features which make the removable battery easier to transport, it is easier for the occupant to transport the removable battery from a drop off location to their final destination, or from their home or office to a pickup location.

In this example, a charging port (704a) is located at the top of the removable battery (700). Diagram 704b shows a close-up view of the charging port (704a) when a cap (706b) is closed. The cap covers an opening or cavity (708b) in which is stored a three-prong male electrical plug (710b) with a retractable cord (712b). Diagram 704c shows the same view as diagram 704b, but with the cap (706c) no longer covering the opening (708c) and the plug (710c) and retractable cord (712c) extended. Including all of the necessary cords and cable to charge the removable battery (700) is desirable because then the person does not need to bring or pack those cords. It is also noted the three-prong male electrical plug (710b/710c) works with standard electrical outlets, which (as described above) is a benefit because no expensive and/or fast charging technology and/or equipment is required.

Removable battery 720 shows another embodiment where the removable battery includes a telescoping handle (722) and a plurality of wheels (724) so that the removable battery can be wheeled about like a rolling suitcase. The top of the removable battery also includes a charging port (726). In some embodiments the charging port is implemented as shown in diagram 704b and 704c. Alternatively, the charging port may be implemented in some other manner.

As described above, in some embodiments, an internal battery (if included in an aircraft) is charged from the removable battery while the removable battery is electrically coupled to the aircraft. The following figures describe some example decision making processes associated with charging an internal battery off of a removable battery.

Figure 8:
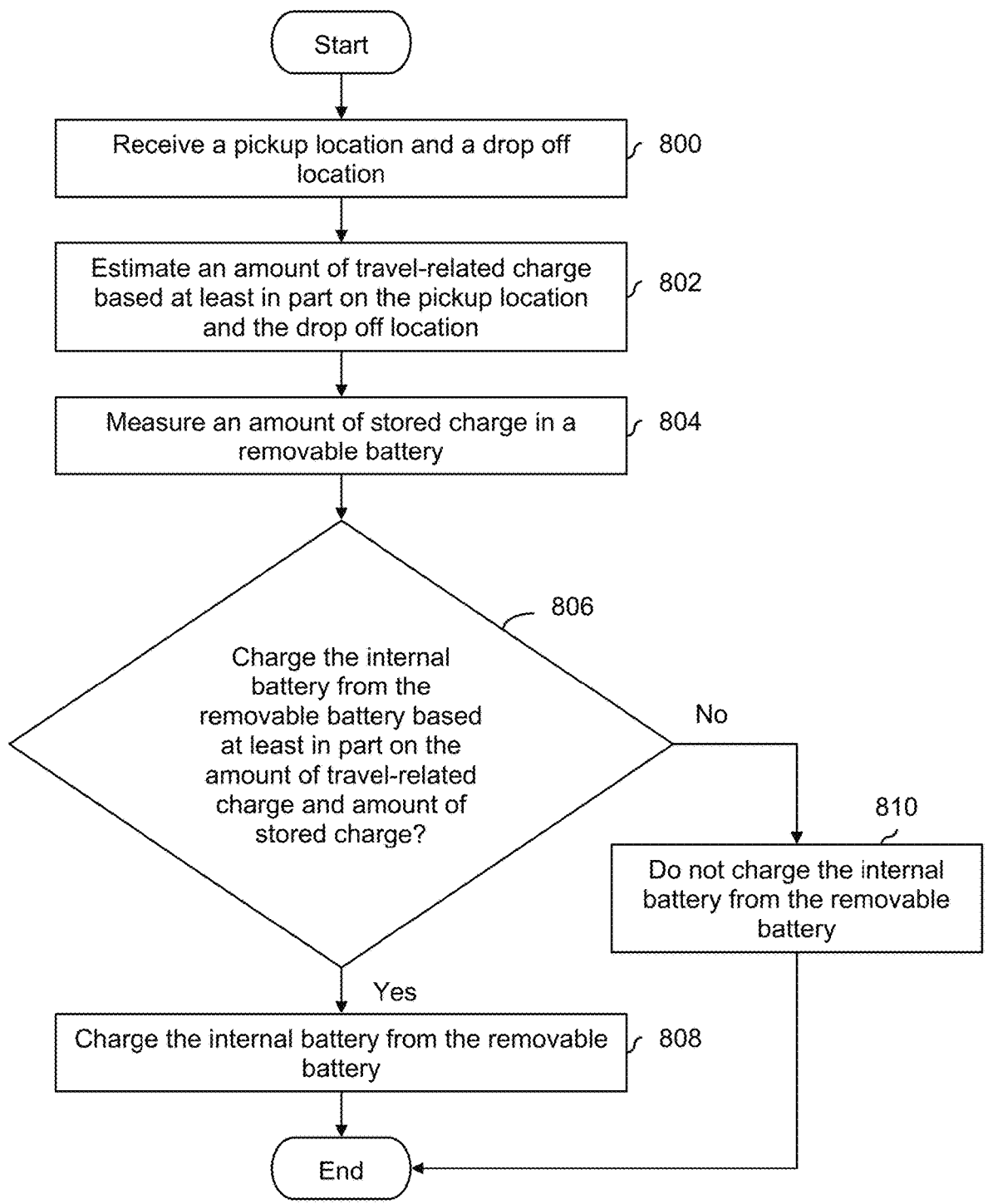
FIG. 8 is a flowchart illustrating an embodiment of a process to decide whether to charge an internal battery off of a removable battery.

FIG. 8 is a flowchart illustrating an embodiment of a process to decide whether to charge an internal battery off of a removable battery. For example, in FIG. 3, this example process could be used to decide whether to charge an internal battery off of a removable battery during the second or occupied leg of the trip shown in FIG. 3 (e.g., between pickup location 302 and drop off location 304). In some embodiments, a removable battery has a larger capacity than the internal battery which permits the former to charge the latter. In some embodiments, the process is performed soon after a removable battery is inserted or otherwise coupled to an aircraft (see, e.g., FIG. 1B).

At 800, a pickup location and a drop off location are received. For example, in FIG. 3, the occupant of the aircraft may have specified a desired pickup location (302) and drop off location (304) when requesting a flight and/or prior to an aircraft being sent to perform the pickup.

At 802, an amount of travel-related charge is estimated based at least in part on the pickup location and the drop off location. For example, in FIG. 3, the amount of charge associated with flying from pickup location (302) and drop off location (304) would be estimated.

At 804, an amount of stored charge in the removable battery is measured. For example, in FIG. 1B, when the removable battery (112b) is inserted into or otherwise coupled with aircraft 100b, a measure of the amount of charge or power in removable battery (112b) is performed.

At 806, it is decided whether to charge an internal battery from the removable battery based at least in part on the amount of travel-related charge and the measured amount of stored charge in the removable battery. Generally speaking, if the measured amount of stored charge in the removable battery (e.g., obtained at 804) minus the amount of charge to fly from the pickup location to the drop off location (e.g., estimated at 802) is relatively high, then the removable battery has sufficient reserves or leftover charge (e.g., after supplying the power to travel between the pickup location to the drop off location) to charge the internal battery. In one example, if this difference (or reserve) is greater than some threshold, it is decided to charge the internal battery from the removable battery. To put it another way, the removable battery will still have a lot of leftover charge even after flying from the pickup location to the drop off location, so why not use this extra charge to charge the internal battery?

In some embodiments, the decision at step 806 takes into account the state of the flight or transportation system as a whole. For example, during the morning or evening rush hour, there may be more demand for flights and it would be undesirable for an aircraft to sit in a depot so that its internal battery can be charged during such periods of high demand. In some embodiments, during periods of high demand (e.g., during predefined times corresponding to historically high demand or based on real-time demand measurements), internal batteries are more aggressively charged using the removable batteries. In some embodiments, as demand for rides or aircraft goes up (e.g., based on historic information or real-time measurements), a threshold (e.g., against which the difference between the measured charge and the amount of travel-related charge is compared) goes down. In other words, the internal batteries will be charged off of removable batteries with less reserve as demand for flights goes up.

In some embodiments, the amount of charge in the internal battery is taken into account at step 806. For example, the amount of charge in the internal battery could also be measured. If the internal battery is almost fully charged, then it may not be necessary to charge the internal battery. In some embodiments, an internal battery is charged if a measured amount of charge in the internal battery is less than a first threshold and the reserve in the removable battery (e.g., the difference between a measured amount of charge in the removable battery and how much will be consumed by the flight from the pickup location to the drop off location) is greater than a second threshold.

If it is decided to charge the internal battery from the removable battery at 806, then at 808 the internal battery is charged from the removable battery. Otherwise, the internal battery is not charged from the removable battery at 810.

Even if it is decided to charge the internal battery from the removable battery, there may be times during the flight when it is undesirable to do so. The following figure describes an example of this.

Figure 9:
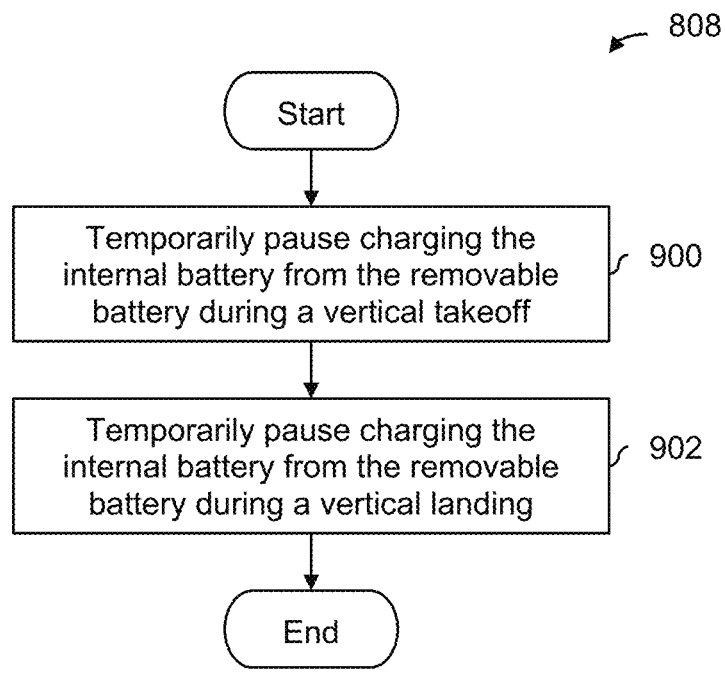
FIG. 9 is a flowchart illustrating an embodiment of a process to refrain from charging an internal battery off of a removable battery during vertical takeoff or landing.

FIG. 9 is a flowchart illustrating an embodiment of a process to refrain from charging an internal battery off of a removable battery during vertical takeoff or landing. In some embodiments, this process is performed while an internal battery is being charged from a removable battery (e.g., at step 808 in FIG. 8). As described above, the personal transportation systems described herein perform vertical takeoff and landing. The most power-intensive part of the flight for such aircraft is during the vertical takeoff and landing. As such, in this example, no charging of the internal battery is performed during this time.

At 900, there is a temporary pause in charging the internal battery from the removable battery during a vertical takeoff. For example, as occupied aircraft (100b) in FIG. 1B ascends vertically, internal battery 104b would not be charged off of removable battery 112b. This permits all of the charge or power in removable battery 112b to be used towards the vertical takeoff which is power intensive.

During the flight (e.g., between the vertical takeoff at step 900 and the vertical landing at 902), the internal battery is charged using the removable battery. This part of the flight may be less power intensive and so it may be acceptable to charge the internal battery from the removable battery. This is especially true if the aircraft embodiment includes wings for at least partial wing borne flight.

At 902, there is a temporary pause in charging the internal battery from the removable battery during a vertical landing. For example, as occupied multicopter 200a in FIG. 2A performs a vertical landing, internal battery 204a would not be charged off of removable battery 212a.

In some embodiments, an occupied personal transportation system may stop forward flight and hover in air. For example, the pilot or autonomous flight process may detect an obstruction in the flight path and stop forward movement, causing the aircraft to hover in the air. Mid-air hovering, like vertical takeoff and landing, is very power intensive and in some embodiments charging of the internal battery from the removable battery is temporarily paused if this occurs.

Returning briefly to FIG. 3, the practical size and weight limitations of the removable battery mean that the range of the personal transportation system is limited. The following figures describe some embodiments for how the range of a personal transportation system may be increased.

Figure 10:
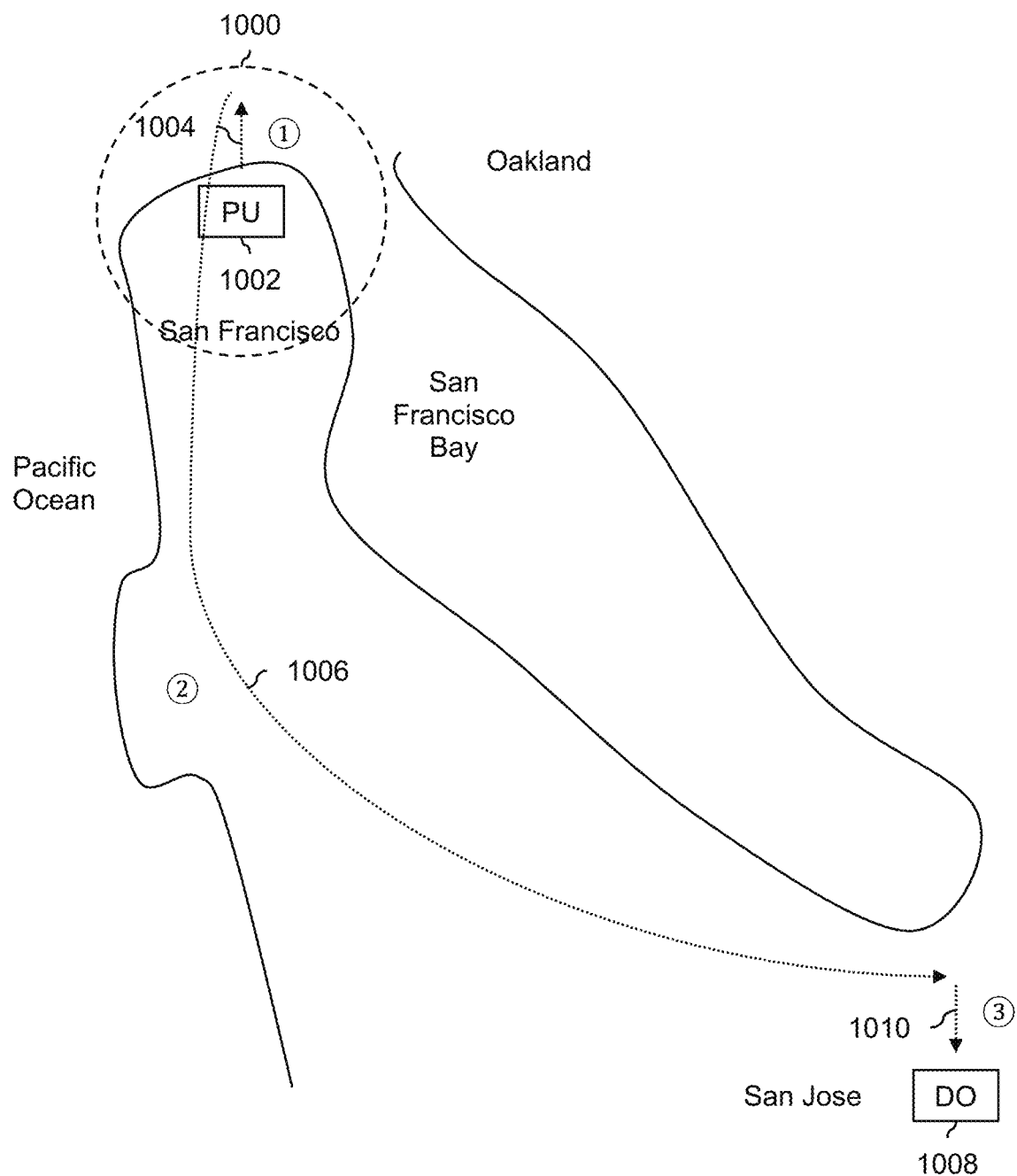
FIG. 10 is a diagram illustrating an embodiment of a two-aircraft personal transportation system.

FIG. 10 is a diagram illustrating an embodiment of a two-aircraft personal transportation system. In the example shown, a personal transportation system with a removable battery (see, e.g., FIGS. 1A-2B) has a range represented by circle 1000 given pickup location 1002. For example, the radius of range 1000 may vary depending upon the capacity of a removable battery (and, if desired, the capacity of a personal transportation system's internal battery as well). In this example, the range (1000) corresponds roughly to the size of a city, in this example San Francisco.

To support a larger (e.g., metropolitan area) transportation system, a two-aircraft configuration may be used as is shown in this example. During a first segment or leg (1004), an occupied aircraft or personal transportation system (for convenience, sometimes referred to as a first aircraft) flies to some location using the power from the removable battery as described above. In this example, this first leg (1004) is relatively short and takes place entirely within the city limits of San Francisco.

Then, with the first aircraft in the air, a second aircraft detachably or removably couples itself to the personal transportation system and tows or otherwise transports the first aircraft over a second leg (1006). As shown here, this second leg (1006) extends from San Francisco to San Jose and is a much longer distance compared to the first leg (1004). During this leg, the second aircraft supplies all of the lift necessary to keep both the first aircraft and the second aircraft airborne. This permits the first aircraft to consume little or no power (e.g., from the removable battery over this relatively long second leg (1006)).

Once the two aircraft get close to the drop off location (1008), the two aircraft decouple from each other. The first aircraft then completes the relatively short third leg (1010) from the decoupling location to the drop off location (1008), once again using power from its removable battery as described above.

By using two aircraft to make the journey, an occupant can get from the pickup location (1002) to the drop off location (1008), even though the drop off location is well outside of range 1000.

In various embodiments, any type of aircraft can be used (e.g., as the first aircraft or the second aircraft) and any appropriate connector or coupler may be used to detachably or temporarily couple the two aircraft to each other. The following figures describe one example where a tilt rotor aircraft is used as the second aircraft.

Figure 11A:
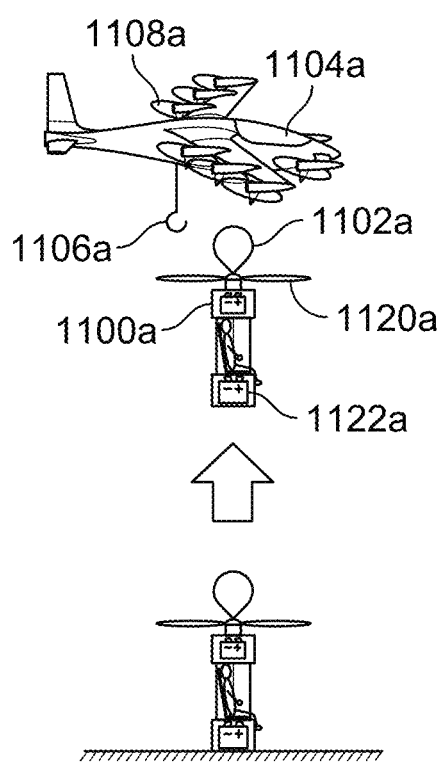
FIG. 11A is a diagram illustrating an embodiment of a tilt rotor aircraft coupling itself to an aircraft with a removable battery.

FIG. 11A is a diagram illustrating an embodiment of a tilt rotor aircraft coupling itself to an aircraft with a removable battery. In the example shown, the first aircraft (1100a) is an occupied aircraft with a removable battery (1122a). The first aircraft (1100a) performs a vertical takeoff using the power from a removable battery as described above. In this example, the aircraft includes a loop (1102a) which extends upward above the aircraft's rotor. For convenience, the aircraft from FIG. 1B is shown as the first aircraft (1100a) but naturally any appropriate personal transportation system and/or aircraft may be used.

Once the first aircraft (1100a) has ascended to some location where the coupling will occur, the first aircraft stops its ascent and hovers midair. For simplicity, in this example the first aircraft (1100a) is shown to ascend strictly vertically (e.g., without any forward and/or lateral movement) and the second aircraft (1104a) comes to the first aircraft. In some embodiments, the first aircraft flies (e.g., moves forward and/or laterally) to some rendezvous point where the coupling will occur (e.g., over water, over a large open space, in some permitted airspace, etc.).

With the first aircraft (1100a) hovering midair, the second aircraft (1104a) couples itself to the first aircraft using a hook (1106a) on the underside of the second aircraft. The hook (1106a) is designed to grab and hold the loop (1102a) on the first aircraft so that the first aircraft can be towed by the second aircraft.

It is noted that the second aircraft (1104a) is a tilt rotor aircraft where the rotors can either be pointed downward (e.g., for hovering, vertical takeoff, vertical landing, etc.) or backward (e.g., for at least partial wing-borne flight where the lift to stay airborne comes at least partially from the wing). In the state shown in FIG. 11A, the rotors (1108a) of the second aircraft (1104a) are pointing downward (e.g., in a hovering position) which permits the second aircraft to hover in the air and make small adjustments or movements along the vertical, yaw, and/or roll axes as desired. This ability to hover and make small adjustments or movements may be desirable while the two aircraft attempt to connect or otherwise couple to each other.

Once the two aircraft are coupled to each other using the hook (1106a) and the loop (1102a), the second aircraft switches its rotors from a downward (e.g., hovering) position to a backward (e.g., forward flight) position. The following figure shows the second aircraft with its rotors in this position.

Figure 11B:
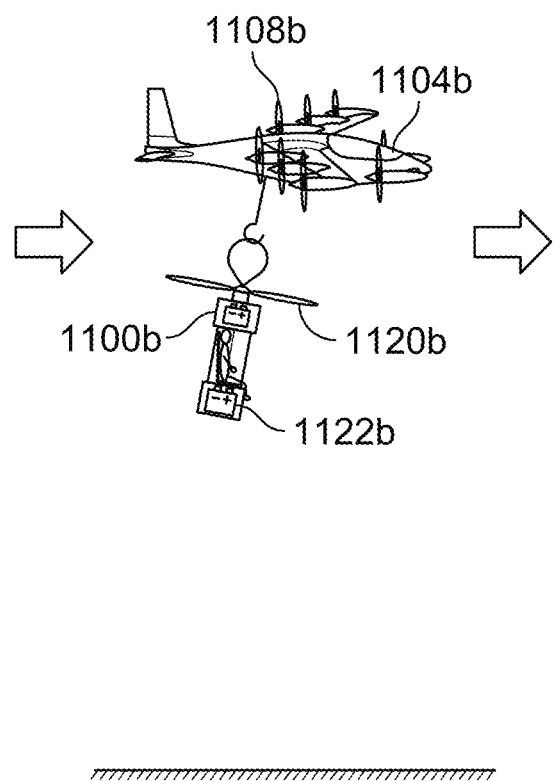
FIG. 11B is a diagram illustrating an embodiment of a tilt rotor aircraft towing an aircraft with a removable battery.

FIG. 11B is a diagram illustrating an embodiment of a tilt rotor aircraft towing an aircraft with a removable battery. In this example, the rotors (1108b) of the second aircraft (1104b) are now pointing backward. With the rotors in this configuration, the second aircraft (1104b) is able to cover large distances more efficiently (e.g., compared to when the rotors are in the downward position) because of the lift from the wings. Returning briefly to FIG. 10, with the tilt rotors pointing backward as shown in FIG. 11B, the second aircraft (with the first aircraft in tow) can efficiently travel the second leg (1006) from San Francisco to San Jose. Returning to FIG. 11B, while the second aircraft (1104b) tows the first aircraft (1100b), the rotor (1120b) of the first aircraft (1100b) is turned off, which permits the power in the removable battery (1122b) to be conserved.

It is noted that between FIG. 10A and FIG. 10B, the tilt rotors (1108a/1108b) of the second aircraft (1104a/1104b) change position from downward to backward and the rotor (1120a/1120b) of the first aircraft (1100a/1100b) stops rotating. Any appropriate sequencing associated with these two changes may be used (e.g., the tilt rotors (1108a/1108b) may change position first and then the single rotor (1120a/1120b) may stop, or vice versa).

The following figure shows the exemplary decoupling of the two exemplary aircraft.

Figure 11C:
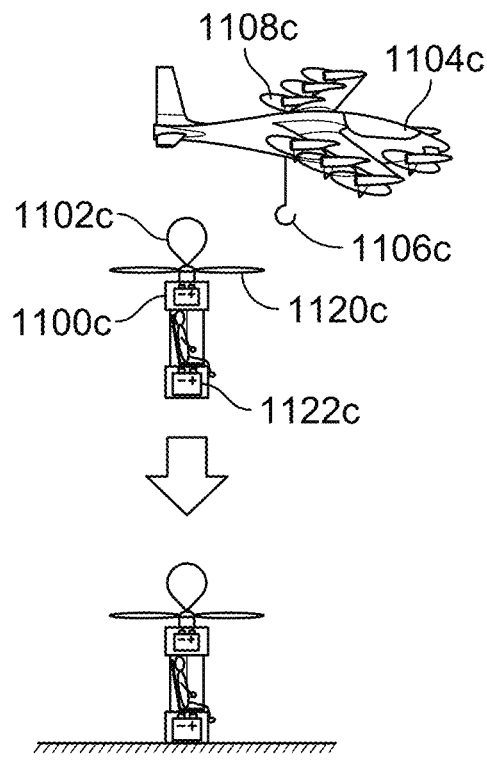
FIG. 11C is a diagram illustrating an embodiment of a tilt rotor aircraft decoupling itself from an aircraft with a removable battery.

FIG. 11C is a diagram illustrating an embodiment of a tilt rotor aircraft decoupling itself from an aircraft with a removable battery. In this example, the first aircraft (1100c) and the second aircraft (1104c) have decoupled from each other. For example, in any appropriate order or sequence, the tilt rotors (1108c) of the second aircraft (1104c) return to a downward facing position (e.g., so that the second aircraft can hover midair and more easily detach the hook (1106c) from the loop (1102c) using small movements and/or adjustments) and the rotor (1120c) of the first aircraft (1100c) turns on. Once the two aircraft are decoupled from each other, the first aircraft (1100c) performs a vertical landing using the power from the removable battery (1122c) as described above.

As described above, a variety of aircraft configurations and/or connectors may be used. The following figure shows an example where the second aircraft is a fixed wing aircraft which performs a conventional takeoff and landing and is used to tow a first aircraft.

Figure 12A:
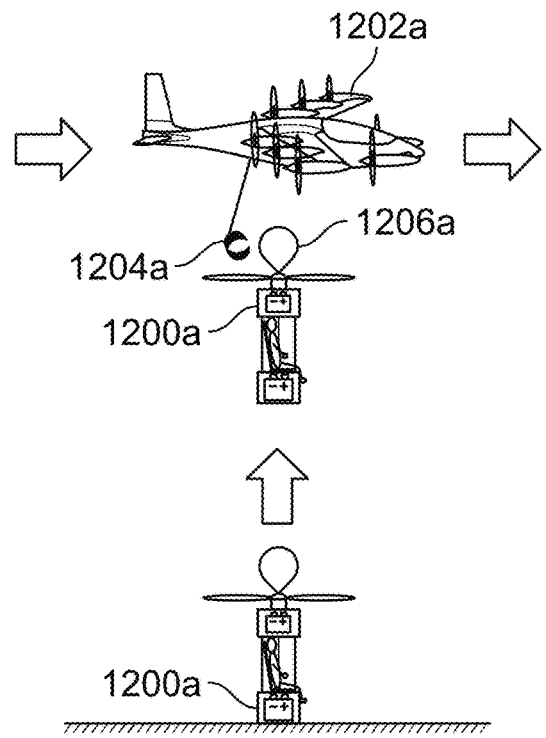
FIG. 12A is a diagram illustrating an embodiment of a conventional takeoff and landing aircraft which is used to transport an aircraft with a removable battery.

FIG. 12A is a diagram illustrating an embodiment of a conventional takeoff and landing aircraft which is used to transport an aircraft with a removable battery. In this example, the first aircraft (1200a) performs a vertical takeoff. Once the first aircraft reaches a location at which the coupling will occur, the first aircraft will hover in air.

A second aircraft (1202a), which in this example performs wing-borne flight and conventional takeoff and landing, uses a claw or grabber (1204a) which includes a plurality of pincers or fingers which can open and close to couple to the first aircraft. In the state shown here, the pincers of the claw (1204a) are open. The second aircraft (1202a) cannot hover midair and so must fly at or above some stall speed when coupling to the hovering first aircraft. In some embodiments, an aircraft with a relatively low stall speed is selected so that the second aircraft can fly at relatively low(er) speeds to make the coupling easier.

The first aircraft (1200a) in this example has a loop (1206a) which points or faces upward. To couple the two aircraft together, the claw (1204a) grabs on to the loop (1206a) and closes its claws. A loop may be attractive because it increases the target area for the claw to hit and generally makes it easier for the two aircraft to connect. For example, if the claw lands in the middle of the loop, the pull on the line will cause the claw to lift up and come into contact with the top of the loop, at which time the claw can close.

Figure 12B:
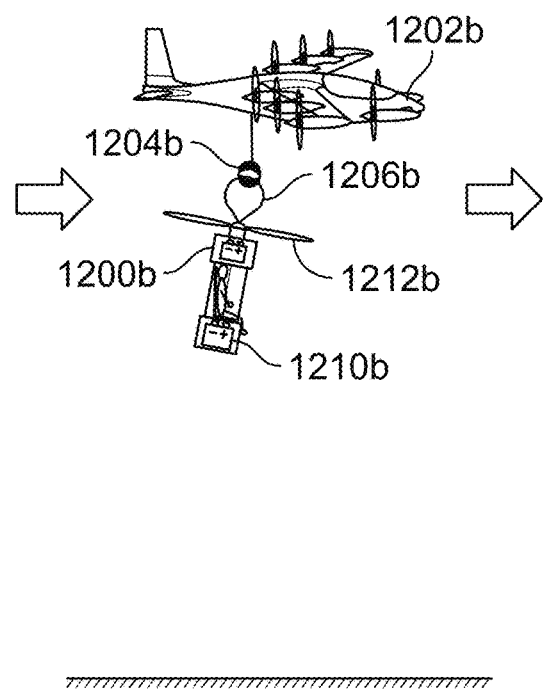
FIG. 12B is a diagram illustrating an embodiment of a conventional takeoff and landing aircraft towing an aircraft with a removable battery.

FIG. 12B is a diagram illustrating an embodiment of a conventional takeoff and landing aircraft towing an aircraft with a removable battery. In the state shown, the claw (1204b) has closed around the loop (1206b) so that the second aircraft (1202b) is towing the first aircraft (1200b). To conserve the power of the removable battery (1210b), the rotor (1212b) of the first aircraft (1200b) is turned off so that all of the lift to keep two aircraft airborne (and the power consumed to that end) comes from the second aircraft (1202b).

Figure 12C:
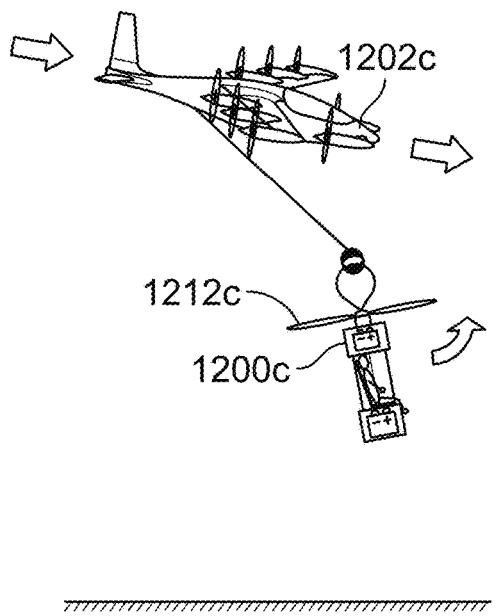
FIG. 12C is a diagram illustrating an embodiment of a conventional takeoff and landing aircraft beginning a release of an aircraft with a removable battery.

FIG. 12C is a diagram illustrating an embodiment of a conventional takeoff and landing aircraft beginning a release of an aircraft with a removable battery. As described above, because the second aircraft (1202c) cannot hover midair and must fly at or above a stall speed, the second aircraft in this example decouples from the first aircraft (1200c) without stopping or otherwise hovering midair. To do this, the second aircraft (1202c) flies in a manner which causes the first aircraft (1200c) to swing like a pendulum. In the state shown here, the first aircraft (1200c) is on the upswing, flying forwards. In this example, to initiate the swinging of the first aircraft, the second aircraft descends, as shown here. Any appropriate maneuvering by the second aircraft (1202c) to cause the first aircraft (1200c) to swing (e.g., like a pendulum) may be used.

In this example, when the first aircraft (1200c) is at or near the apex of its swing, the second aircraft (1202c) will set the first aircraft down on the ground. In some embodiments, for safety and/or to help with a softer landing, the rotor (1212c) of the first aircraft (1200c) is turned on prior to the decoupling and landing.

Figure 12D:
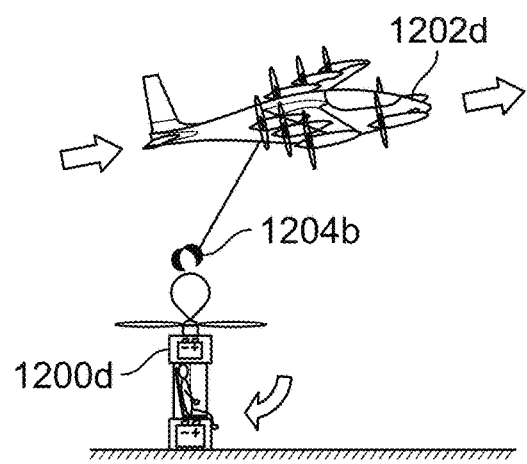
FIG. 12D is a diagram illustrating an embodiment of an aircraft with a removable battery after being released by a conventional takeoff and landing aircraft.

FIG. 12D is a diagram illustrating an embodiment of an aircraft with a removable battery after being released by a conventional takeoff and landing aircraft. In the state shown here, the first aircraft (1200d) has been deposited on the ground by the second aircraft (1202d) and the claw (1204d) has been opened so that the two aircraft can decouple. The second aircraft (1202d), having descended to deposit the first aircraft on the ground, begins to ascend again. In the state shown here, the first aircraft (1200d) is in its downswing (e.g., it reached its apex and just began its downswing) when the first aircraft was deposited on the ground. As described above, the first aircraft may be deposited on the ground at any appropriate (e.g., comfortable) point in the up or down swing of the first aircraft.

The two examples described above are merely exemplary and are not intended to be limiting. For example, although not described above, the first aircraft may be on the ground when it is coupled to the second aircraft. In various embodiments due to a variety of factors (e.g., aircraft performance limitations, land/air use restrictions (e.g., zoning rules), the local environment (e.g., at ground level there is very little clearance and/or footprint to be deposited and/or picked up using a conventional takeoff and landing aircraft), etc.), the two aircraft may be coupled and decoupled together in an appropriate manner.

In some other embodiments, some other coupling or transport technique or paradigm is used. For example, the second aircraft could "swallow" the first aircraft so that the first aircraft is completely surrounded by the second aircraft. The first aircraft could dock in the second aircraft (e.g., where the second aircraft may have multiple bays or slots for multiple aircraft to dock in). The second aircraft may push the first aircraft in front of it (e.g., instead of pulling or towing the first aircraft behind the second aircraft). The second aircraft could have a platform on which the first aircraft rests. The general idea is that the first aircraft can fly beyond the range of its removable battery (and internal battery as well, if desired) by having the second aircraft expend its power to keep both aircraft airborne.

The following figures describe the above two-aircraft examples more generally and/or formally in flowcharts.

Figure 13:
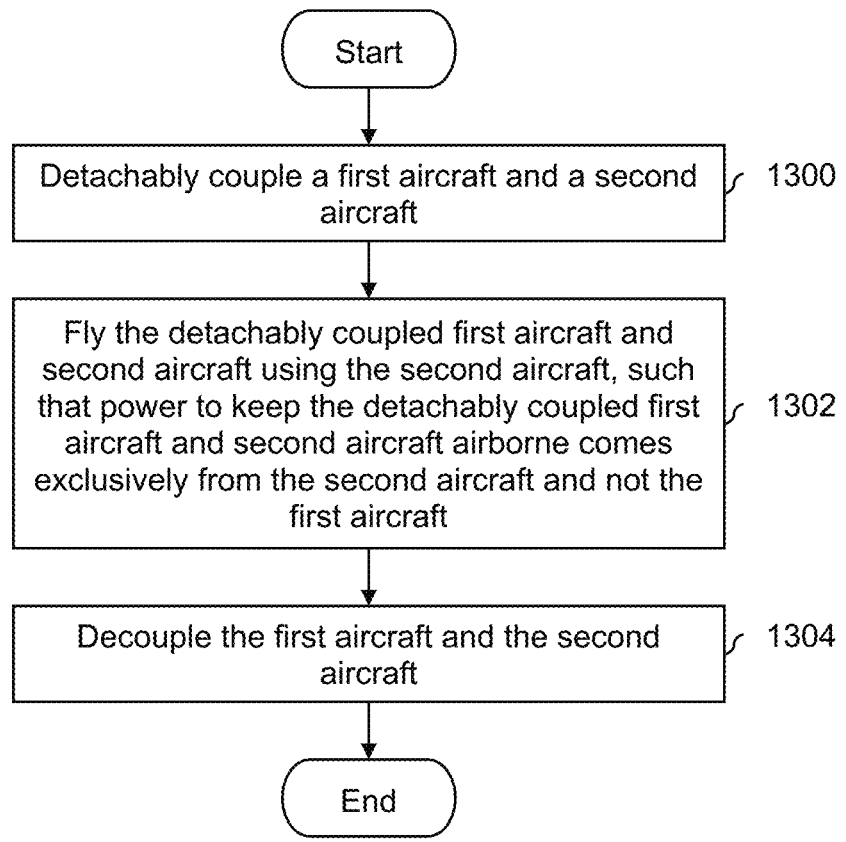
FIG. 13 is a flowchart illustrating an embodiment of a process to extend the range of a first aircraft with the help of a second aircraft.

FIG. 13 is a flowchart illustrating an embodiment of a process to extend the range of a first aircraft with the help of a second aircraft. For example, a first aircraft with range 1000 in FIG. 10 (e.g., given pickup (take off) location 1002) can make it to drop off location 1008 with the help of a second aircraft. In some embodiments, the example process shown herein is performed by the second aircraft.

At 1300, a first aircraft and a second aircraft are detachably coupled. See, for example, FIG. 11A and FIG. 12A. As described above, a variety of coupling techniques, coupling or rendezvous locations (e.g., the first aircraft may be on the ground), and/or aircraft types (e.g., fixed wing, tilt wing, tilt rotor, etc.) may be used. In some embodiments, the first aircraft has a removable battery (see, e.g., FIGS. 1A-2B and FIGS. 4 and 5) but for brevity those characteristics and/or properties are not described in this example.

At 1302, the detachably coupled first aircraft and second aircraft are flown using the second aircraft, such that power to keep the detachably coupled first aircraft and second aircraft airborne comes exclusively from the second aircraft and not the first aircraft. For example, this corresponds to resting the removable battery of the first aircraft during the second leg (1006) of FIG. 10. See also FIG. 11B and FIG. 12B where the second aircraft (1104b and 1202b, respectively) is providing all of the power to keep the two coupled aircraft airborne.

At 1304, the first aircraft and the second aircraft are decoupled. See, for example, FIG. 11C where the two aircraft are decoupled and then the first aircraft performs a vertical landing on its own power. Alternatively, in the example of FIG. 12C and FIG. 12D, the second aircraft (1202c/1202d) swings the first aircraft (1200c/1200d) like a pendulum and deposits the first aircraft on the ground (e.g., with or without the first aircraft powering up its rotor).

Figure 14:
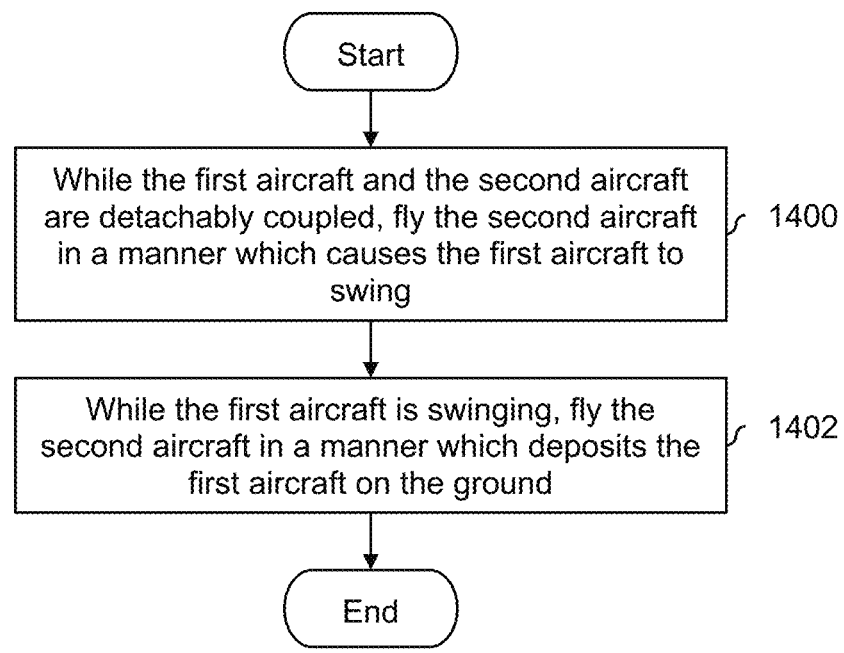
FIG. 14 is a flowchart illustrating an embodiment of a process to extend the range of a first aircraft with the help of a second aircraft.

FIG. 14 is a flowchart illustrating an embodiment of a process to extend the range of a first aircraft with the help of a second aircraft. In some embodiments, the process of FIG. 14 is performed in combination with the process of FIG. 13 (e.g., between steps 1302 and 1304). In some embodiments, the process is performed by the second aircraft. As described above, this may be a way for the second aircraft to decouple from the first aircraft without the second aircraft having to stop (e.g., because it needs to stay at or above a stall speed and cannot stop to detach the first aircraft).

At 1400, while the first aircraft and the second aircraft are detachably coupled, the second aircraft is flown in a manner which causes the first aircraft to swing. See, for example, FIG. 12C where the second aircraft (1202c) descends, causing the first aircraft (1200c) to swing forward like a pendulum.

At 1402, while the first aircraft is swinging, the second aircraft is flown in a manner which deposits the first aircraft on the ground. See, for example, FIG. 12D where the second aircraft (1202d) has deposited the first aircraft (1200d) on the ground, in this example during the downswing of the first aircraft. As described above, in some embodiments, the second aircraft deposits the first aircraft on the ground when the first aircraft is at or near the apex of its (pendulum-like) swing.

In applications such as that described in FIG. 3 where an aircraft or other vehicle (e.g., which is powered by an internal battery and/or a removable battery) can be dispatched to pick up and drop off an occupant, power considerations should be taken into account so that the vehicle has sufficient power during all legs of the trip. The following figures describe some examples of such processes.

Figure 15:
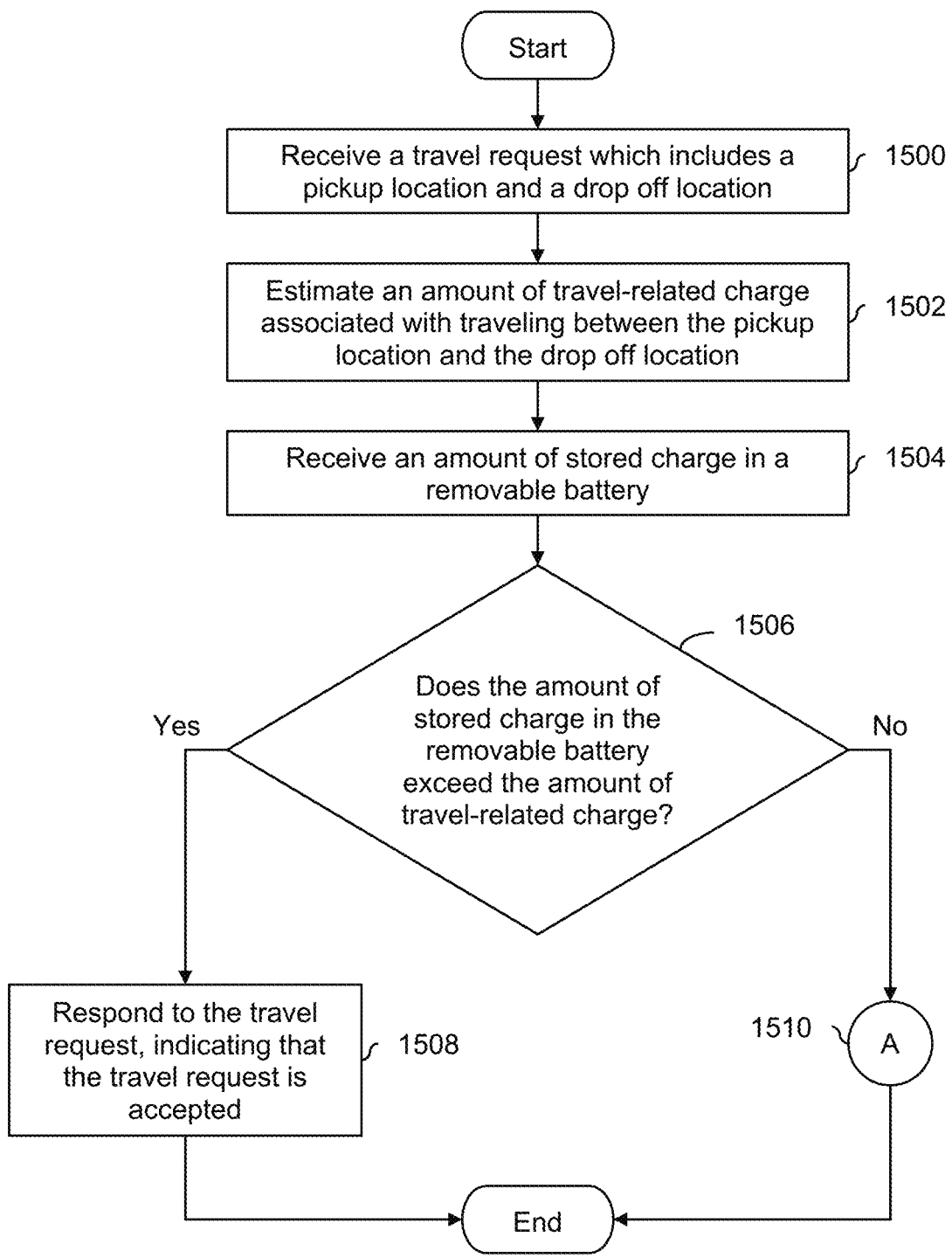
FIG. 15 is a flowchart illustrating an embodiment of a process to respond to a travel request based on an amount of stored charge in a removable battery.

FIG. 15 is a flowchart illustrating an embodiment of a process to respond to a travel request based on an amount of stored charge in a removable battery. In some embodiments, the process is performed by some central server (e.g., associated with a flight or other ride service provider) which accepts or declines requests for travel.

At 1500, a travel request which includes a pickup location and a drop off location is received. In the example of FIG. 3, a person at home (i.e., pickup location 302) who wants a ride to work would send a travel request which specifies the pickup location as their home (302) and the drop off location as their work (304).

At 1502, an amount of travel-related charge associated with traveling between the pickup location and the drop off location is estimated. For example, in FIG. 3, this would correspond to estimating the amount of charge required to travel the second leg from pickup location (302) to the drop off location (304). In various embodiments, this estimation is based on the weight of the (unoccupied) aircraft, the weight of the occupant, the weight of the removable battery, a selected flight path (e.g., to avoid no-fly zones, to stay within predefined travel corridors or routes, etc.), and/or travel conditions (e.g., for an aircraft, more charge would be required to fly when there is a headwind versus no wind or a tailwind).

At 1504, an amount of stored charge in a removable battery is received. In some embodiments, to make it simpler and/or easier for the requester and/or to prevent the requester from providing any false information, techniques to eliminate the requester from this exchange and/or techniques to verify any provided information may be employed.

As an example of the former, the removable battery may have a built-in measurement module or block (e.g., which measures the amount of charge current stored) and a built-in communication module or block (e.g., which wirelessly sends the measured amount of stored charge over a cellular data network or other wireless network to the server performing the exemplary process).

As an example of the latter, there may be some verification code which must also be provided in addition to a provided or specified amount of charge (e.g., both of which are provided or otherwise input by the ride requester). For example, the removable battery may have two alphanumeric displays: one which displays the amount of stored charge in the removable battery and another display which displays a verification code (e.g., which depends both upon the amount of stored charge and some unpredictable and/or unknown (to the user) value). The server could then compare both values to determine if the amount of stored charge specified or otherwise provided by the ride requester is legitimate or otherwise accurate.

At 1506, it is determined if the amount of stored charge in the removable battery exceeds the amount of travel-related charge. In this example, the process will accept the travel request if the amount of stored charge in the removable battery is sufficient to power the aircraft or other vehicle between the pickup location and drop off location without running out of charge. For example, the decision at step 1506 corresponds in FIG. 3 to deciding if the amount of stored charge that the requester has in their removable battery is sufficient to fly or otherwise travel from pickup location 302 to drop off location 304 (e.g., without assistance from the internal battery during that second leg).

If so, the travel request is responded to, indicating that the travel request is accepted at 1508. Otherwise, some other step(s) are performed at 1510. In some embodiments, the travel request is accepted or rejected based solely on the stored charge in the removable battery. That is, it is not permissible to tap the resource of the internal battery when the occupied aircraft or other vehicle travels from the pickup location to the drop off location. In such embodiments, step 1510 would comprise responded to travel request, indicating that the travel request is not accepted (e.g., because the stored charge in the removable battery cannot sufficiently and solely provide power to travel from the pickup location to the drop off location, and this scenario does not permit the internal battery to be tapped or otherwise used to supplement the removable battery during this leg).

Alternatively, in some embodiments, the internal battery may be used to supplement the removable battery during this leg between the pickup location and drop off location. The following figure describes an example of step 1510 for such an embodiment.

Figure 16:
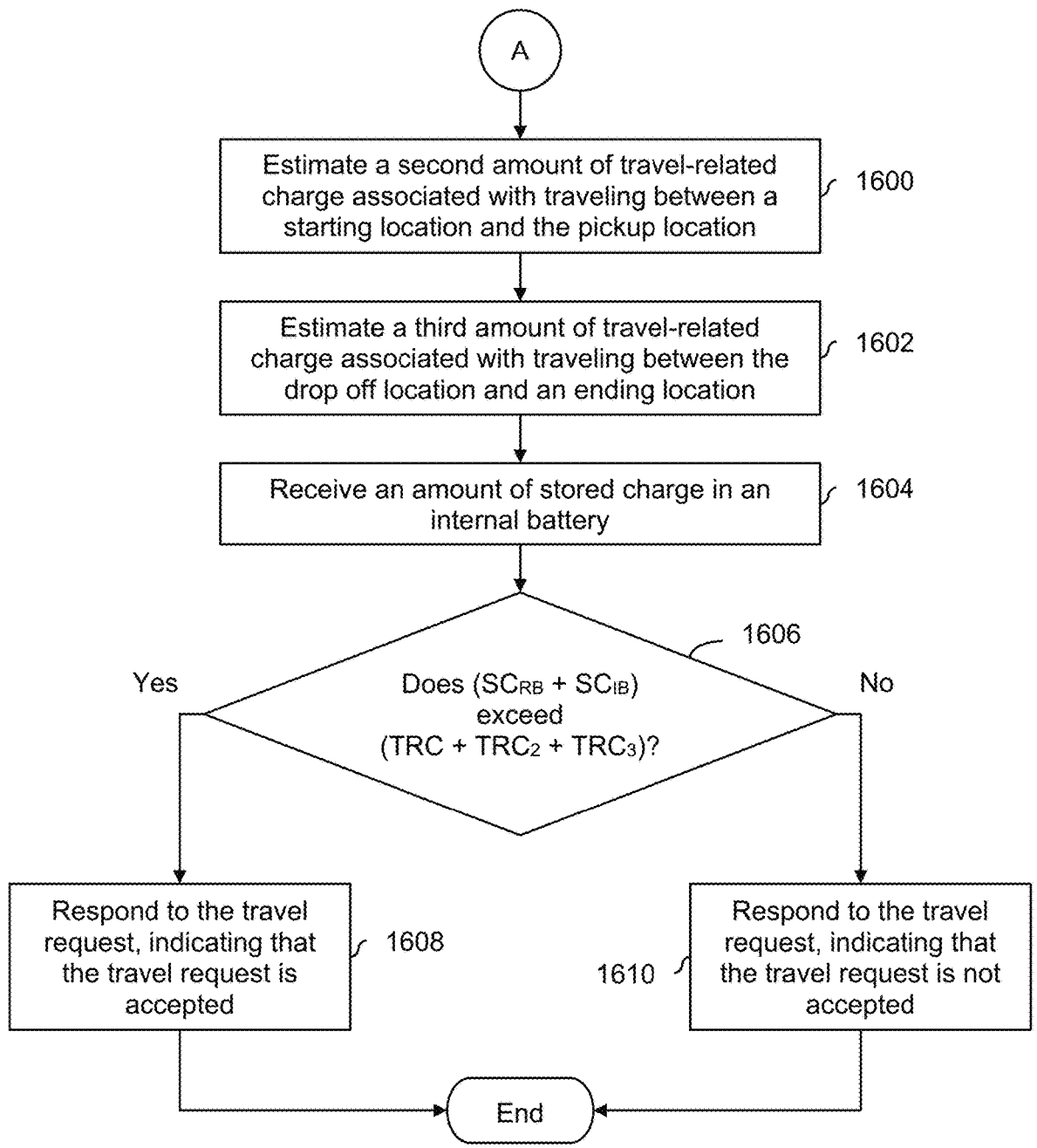
FIG. 16 is a flowchart illustrating an embodiment of a process to respond to a travel request based on an amount of stored charge in a removable battery and an amount of stored charge in an internal battery.

FIG. 16 is a flowchart illustrating an embodiment of a process to respond to a travel request based on an amount of stored charge in a removable battery and an amount of stored charge in an internal battery. In some embodiments, the process of FIG. 16 is used at step 1510 in FIG. 15.

At 1600, a second amount of travel-related charge associated with traveling between a starting location and the pickup location is estimated. The starting location is the location from which the vehicle begins its trip. For example, in FIG. 3, where the aircraft is waiting at depot 300 to be deployed, the starting location is depot 300. The second amount of travel-related charge estimated in FIG. 3 would be the amount of charge required for the unoccupied aircraft or other vehicle to travel the first leg of the trip from depot 300 to pickup location 302.

In some cases, a vehicle is not waiting in a depot but is in use (e.g., servicing some other and/or previous ride requester). In such cases, the starting location may not necessarily be a depot, but rather the drop off point of the previous requested ride (e.g., where as soon as the vehicle drops off the earlier ride requester, the vehicle, in this example at least, would go directly to the pickup location of the next ride requester).

At 1602, a third amount of travel-related charge associated with traveling between the drop off location and an ending location is estimated. For example, in FIG. 3, this would be the amount of charge required for the unoccupied aircraft or other vehicle to travel the third leg of the trip from drop off location 304 to depot 306 (which in this example is the ending location).

Similar to the starting location, the ending location may depend upon whether there is another, pending ride requester to be serviced. For example, if there is no next or pending ride request, then the ending location may be a depot. See, for example FIG. 3 where there is no next or pending ride requester and the aircraft goes to depot 306. Alternatively, if there is a next and/or pending ride requester, then the ending location may be the next pickup location.

At 1604, an amount of stored charge in an internal battery is received. Since the aircraft or other vehicle may be unattended and/or unoccupied at times, in some embodiments the internal battery includes a built-in measurement module or block as well as a built-in communication module or block, as described above with respect to the removable battery.

At 1606, it is determined whether a (first) sum of the amount of stored charge in the removable battery ($SC_{RB}$) plus the amount of stored charge in the internal battery ($SC_{IB}$) exceeds a (second) sum of the travel-related charge associated with traveling between the pickup location and the drop off location (TRC) plus the second amount of travel-related charge associated with traveling between a starting location and the pickup location ($TRC_2$) plus the third amount of travel-related charge associated with traveling between the drop off location and an ending location ($TRC_3$).

If the decision at 1606 is Yes, then at 1608 the travel request is responded to, indicating that the travel request is accepted. If the decision at 1606 is No, then at 1610 the travel request is responded to, indicating that the travel request is not accepted.

Using FIG. 3 as an example, the decision at 16060 is equivalent to deciding whether each of the three legs shown there (e.g., with the corresponding available batteries for each leg) has sufficient charge available so as not to crash or otherwise stall during each leg. For example, during the second leg shown in FIG. 3, the removable battery would be drained and the internal battery would be used to supplement or otherwise make up the difference for any additional charge required for that second leg; the check at step 1606 would ensure that the first leg (when only the internal battery is available) and the third leg (when again only the internal battery is available) will have enough (e.g., remaining) charge so as not to crash or otherwise stall.

Similarly, the server in some embodiments ensures that any aircraft or vehicle assigned to pick up an occupant or ride requester has an internal battery with sufficient charge to complete all legs of the trip (e.g., assuming a single aircraft scenario where a second aircraft is not used to tow the first aircraft). The following figure shows one example of this.

Figure 17:
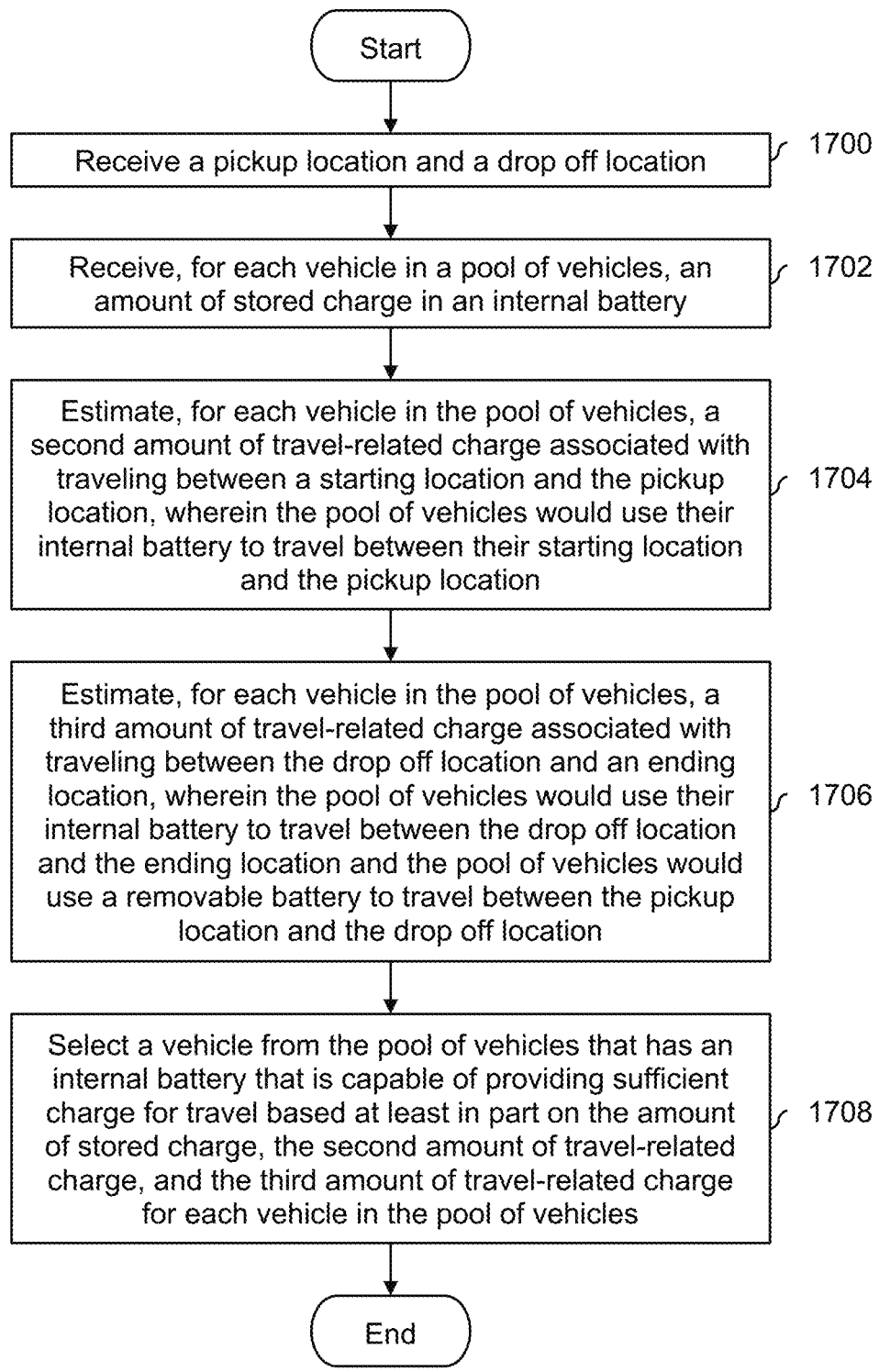
FIG. 17 is a flowchart illustrating an embodiment of a process to select a vehicle from the pool of vehicles that is capable of providing sufficient charge for travel.

FIG. 17 is a flowchart illustrating an embodiment of a process to select a vehicle from the pool of vehicles that is capable of providing sufficient charge for travel. In some embodiments, the process is performed by a central server (e.g., associated with a flight or other ride service provider) which selects an aircraft or other vehicle from a pool or fleet to service an accepted travel request.

At 1700, a pickup location and a drop off location are received. For example, as described above, these two pieces of information may be included in a travel request. In the example of FIG. 3, a travel request would specify pickup location 302 and drop off location 304.

At 1702, for each vehicle in a pool of vehicles, an amount of stored charge in an internal battery is received. For example, if there are n vehicles in the pool, then stored charges ($SC_1$, $SC_2$, . . . , $SC_{n-1}$, $SC_n$) would be received. As described above, there may be built-in measurement and/or communication modules or blocks to send or otherwise transfer this information.

In some embodiments, all of the vehicles and internal batteries are the same (e.g., with the same charge storage capacity), but some internal batteries are only partially charged whereas others are fully charged. And even if all of the internal batteries are fully charged, due to age, wear, and/or slight manufacturing differences, there may be slight differences in the amounts of stored charge.

Alternatively, a pool of vehicles may include different types of vehicles with different internal batteries having different charge storage capacities (e.g., maximum amounts of stored charges). For example, there may be heavier vehicles with larger internal batteries as well as lighter vehicles with smaller internal batteries.

At 1704, for each vehicle in the pool of vehicles, a second amount of travel-related charge associated with traveling between a starting location and the pickup location is estimated, wherein the pool of vehicles would use their internal battery to travel between their starting location and the pickup location. For example, ($TRC_{2,1}$, $TRC_{2,2}$, ..., $TRC_{2,n-1}$, $TRC_{2,n}$) would be estimated for a pool of n vehicles.

In the example of FIG. 3, the second amount of travel-related charge estimated would be the amount of charge (e.g., for each vehicle) to travel the first leg from a starting location of depot 300 to pickup location 302. It is noted that this estimation may depend upon the unoccupied weight of the aircraft or vehicle (e.g., where some aircraft or vehicles in the pool may be heavier than others).

At 1706, for each vehicle in the pool of vehicles, a third amount of travel-related charge associated with traveling between the drop off location and an ending location is estimated, wherein the pool of vehicles would use their internal battery to travel between the drop off location and the ending location and the pool of vehicles would use a removable battery to travel between the pickup location and the drop off location. For example, ($TRC_{3,1}$, $TRC_{3,2}$, ..., $TRC_{3,n}$) would be estimated for a pool of n vehicles.

In the example of FIG. 3, the third amount of travel-related charge estimated would be the amount of charge (e.g., for each vehicle) to travel the third leg from drop off location 304 to an ending location of depot 306.

At 1708, a vehicle is selected from the pool of vehicles that has an internal battery that is capable of providing sufficient charge for travel based at least in part on the amount of stored charge, the second amount of travel-related charge, and the third amount of travel-related charge for each vehicle in the pool of vehicles. For example, for the first potential vehicle in the pool, its amount of stored charge (i.e., $SC_1$) would be compared against the sum of its second amount of travel-related charge (i.e., $TRC_{2,1}$) plus its third amount of travel-related charge (i.e., $TRC_{3,1}$). If the former exceeded the latter, then the first potential vehicle has sufficient charge for the requested trip. This process would be repeated for the other (n−1) potential vehicles in the pool. From the subset of vehicles which pass this test, a vehicle may be selected using any appropriate technique (e.g., closest to pickup location).

In some embodiments, the process of FIG. 17 is performed multiple times, as/if needed. In one example, during a first iteration of FIG. 17, the pool of vehicles excludes any vehicles that are in-use (i.e., only vehicles that are available and/or free are considered). For example, available and/or free vehicles may be in some depot waiting to be deployed and may or may not be fully charged. This may ensure that requests are quickly responded to because the ride requester does not need to wait for a vehicle to become free or otherwise available.

In some embodiments, if no suitable vehicles are found at step 1708 during a first iteration that only considers free or available vehicles, the process of FIG. 17 is repeated, this time using or otherwise considering vehicles which are in-use. The following figure shows one example of this.

Figure 18:
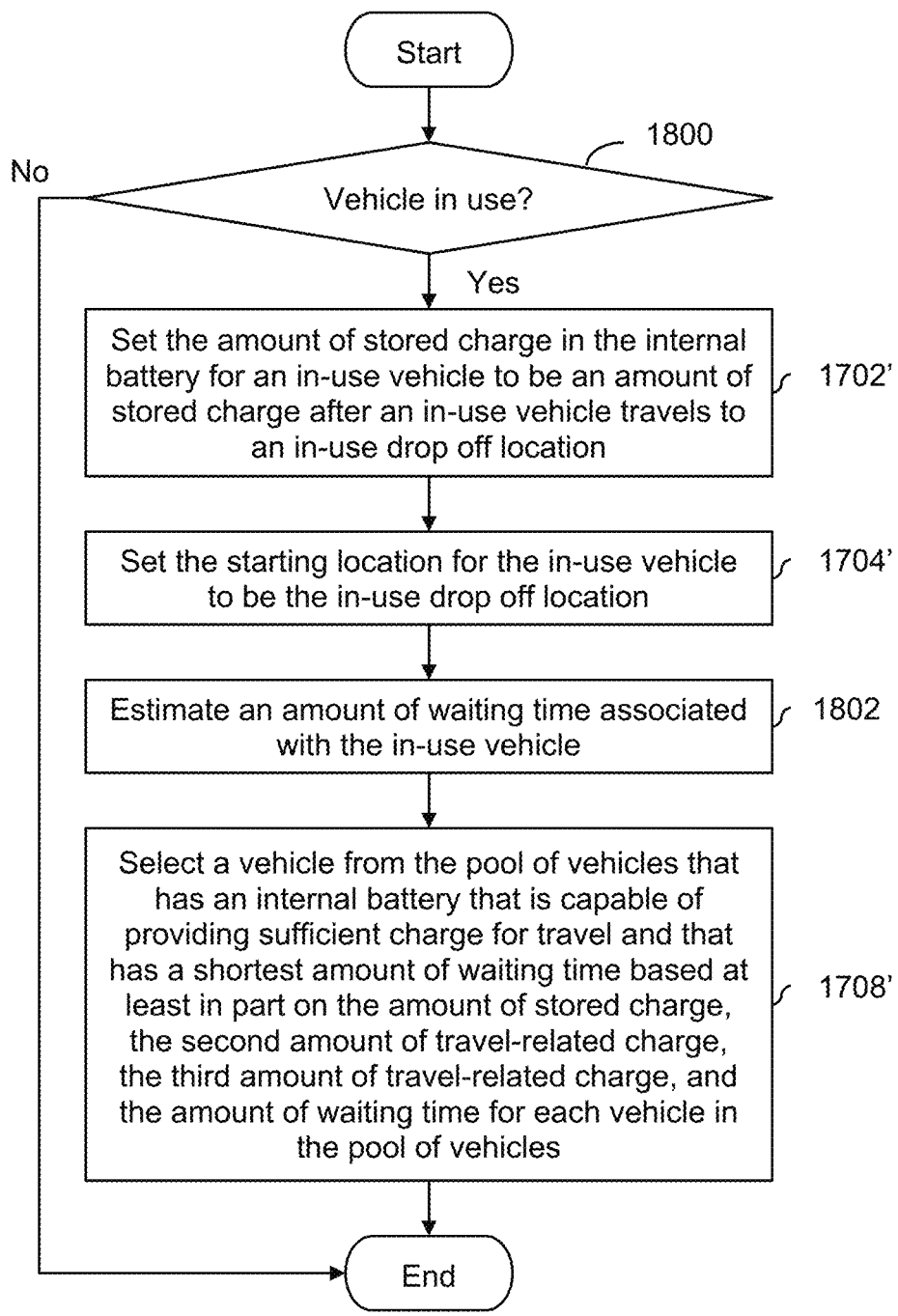
FIG. 18 is a diagram illustrating an embodiment of a process to include in-use vehicles when selecting a vehicle from a pool, where the internal battery of an in-use vehicle would not be charged prior to pickup of a next ride requester.

FIG. 18 is a diagram illustrating an embodiment of a process to include in-use vehicles when selecting a vehicle from a pool, where the internal battery of an in-use vehicle would not be charged prior to pickup of a next ride requester.

As described above, in some embodiments, the exemplary process shown here is used during a second iteration of the process of FIG. 17 so that in-use vehicles may be considered. In some embodiments, the process is repeated for each in-use vehicle (e.g., so that all in-use vehicles are considered). For convenience, steps which are related between FIG. 17 and FIG. 18 are indicated using similar reference numbers.

At 1800, it is decided whether a vehicle is in use. For example, in FIG. 3, if a vehicle is in the first leg (between depot or staring location 300 and pickup location 302) or is in the second leg (between pickup location 302 and drop off location 304), then the vehicle is considered to be in use. Alternatively, if the vehicle is in the third leg (between drop off location 304 and depot 306) or is waiting at depot 306, then the vehicle is considered to not be in use (i.e., it is free or otherwise available).

If the vehicle is determined to not be in use at 1800, then the process ends. To clearly show that this process relates only to in-use vehicles, step 1800 is included.

Otherwise, if it is determined that the vehicle is in use at step 1800, the amount of stored charge in the internal battery for an in-use vehicle is set to be an amount of stored charge after an in-use vehicle travels to an in-use drop off location at 1702'. For example, in FIG. 3, suppose that an exemplary in-use vehicle is in the second leg of the trip. The amount of stored charge would be set at step 1702' to the amount of stored charge the in-use vehicle would have after dropping the first occupant or ride requester off at in-use drop off location (304). The use of the qualifier "in-use" is used to indicate or otherwise designate something related to the current ride or travel which makes the vehicle in use as opposed to not in use.

In the context of FIG. 17, the amount of stored charge in the internal battery set at step 1702' in this process would be received by or otherwise input to the process of FIG. 17 at step 1702 in FIG. 17.

Returning to FIG. 18, at 1704', the starting location for the in-use vehicle is set to be the in-use drop off location. To continue the example from above where the in-use vehicle is in the second leg of the trip shown in FIG. 3, the starting location (e.g., received by or otherwise input to the process of FIG. 17 at step 1704) is set to be the (in-use) drop off location (304).

In other words, what steps 1702' and 1704' do (e.g., within the context or umbrella of FIG. 17) is enable consideration of an in-use vehicle where it is assumed that the in-use vehicle would be dispatched from the previous drop off location directly to the new pickup location (e.g., without going to a depot and/or without charging its internal battery). This may be faster (e.g., because no charging or intervening stop is permitted before the next pickup), but obviously does not permit charging of the internal battery.

At 1802, an amount of waiting time associated with the in-use vehicle is estimated. For example, this would be the amount of time a ride requester would be waiting if that particular in-use vehicle were assigned to that ride requester. This may include whether the in-use vehicle has just picked up the current ride requester or is almost done, how far that ride is (e.g., if the current ride requester was just picked up), and a distance from the in-use drop off location to the pickup location, etc.

At 1708', a vehicle is selected from the pool of vehicles that has an internal battery that is capable of providing sufficient charge for travel and that has a shortest amount of waiting time based at least in part on the amount of stored charge, the second amount of travel-related charge, the third amount of travel-related charge, and the amount of waiting time for each vehicle in the pool of vehicles. In other words, the process will try to find the vehicle which will minimize the wait experience by the ride requester while still ensuring that the assigned or otherwise selected vehicle has enough stored charge in its internal battery to complete all legs of the trip.

In some embodiments, a second iteration of FIG. 17 which considered in-use vehicles which are not permitted to be charged first (e.g., before picking up the ride requester) fails to find a vehicle with sufficient charge (e.g., at step 1708 during a second iteration of FIG. 17). In some such embodiments, a third iteration of FIG. 17 is performed, where in-use vehicles are considered and they are permitted to be charged (at least partially) before picking up the ride requester. This may be the least desirable option because it further increases the wait time of the ride requester and is thus performed last. The following figure shows an example of this.

Figure 19:
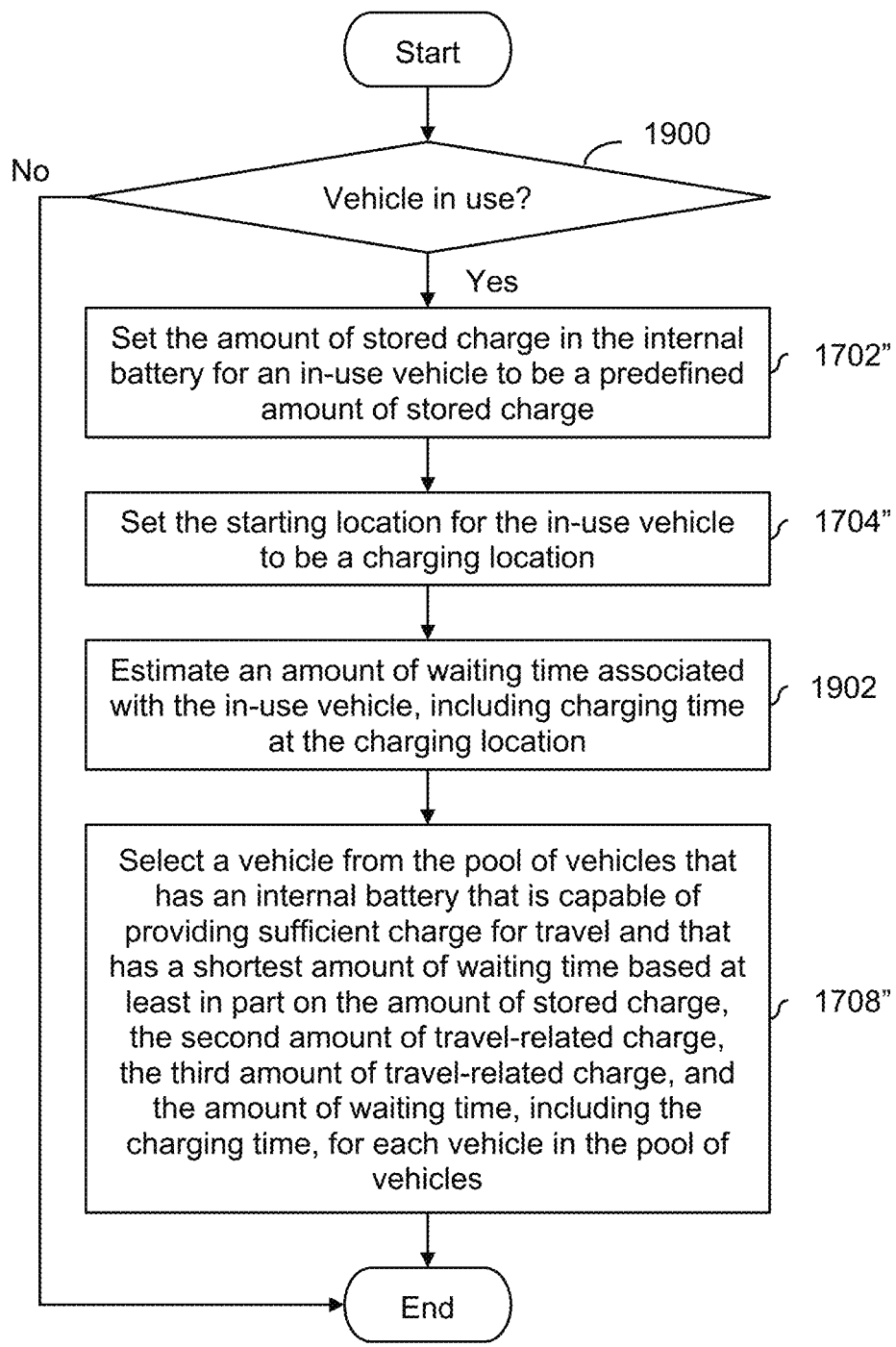
FIG. 19 is a diagram illustrating an embodiment of a process to include in-use vehicles when selecting a vehicle from a pool, where the internal battery of an in-use vehicle is charged prior to pickup of a next ride requester.

FIG. 19 is a diagram illustrating an embodiment of a process to include in-use vehicles when selecting a vehicle from a pool, where the internal battery of an in-use vehicle is charged prior to pickup of a next ride requester. As described above, in some embodiments, the exemplary process shown here is used during a third iteration of the process of FIG. 17 so that in-use vehicles (after some charging) may be considered. In some embodiments, the process is repeated for each in-use vehicle (e.g., so that all in-use vehicles are considered). For convenience, steps which are related between FIG. 17 and FIG. 19 are indicated using similar reference numbers.

At 1900, it is determined if a vehicle is in use. If it is determined to be in use at step 1900, the amount of stored charge in the internal battery for an in-use vehicle is set to be a predefined amount of stored charge at 1702″. In this example, the internal battery of the in-use vehicle will be charged up to some predefined amount. For example, it may be fully charged. Alternatively, to reduce wait time, the internal battery may only be partially charged.

At 1704″, the starting location for the in-use vehicle is set to be a charging location. This is because the in-use vehicle will to a charging station (e.g., one of the depots shown in FIG. 3) to be charged before potentially picking up the ride requester. In some embodiments, the charging location is between the in-use drop off location and the next pickup location.

At 1902, an amount of waiting time associated with the in-use vehicle is estimate, including charging time at the charging location. For example, this may include completing the current trip, traveling to the charging station, charging time at the charging station, and traveling from the charging station to the (next) pickup location.

At 1708″, a vehicle is selected from the pool of vehicles that has an internal battery that is capable of providing sufficient charge for travel and that has a shortest amount of waiting time based at least in part on the amount of stored charge, the second amount of travel-related charge, the third amount of travel-related charge, and the amount of waiting time, including the charging time, for each vehicle in the pool of vehicles. Again, this attempts to select the in-use vehicle that has the shortest waiting time while still ensuring that the internal battery (after charging) will have sufficient charge to complete all legs of the next trip (e.g., for which a vehicle is being selected).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first battery; and
a controller which is configured to:
perform a vertical landing of an aircraft using the first battery, wherein:
the aircraft is unoccupied when the vertical landing is performed;
the unoccupied aircraft includes the first battery; and
the unoccupied aircraft excludes a second, removable battery;
detect the second, removable battery being detachably coupled to the aircraft;
in response to detecting the second, removable battery being detachably coupled to the aircraft, switch a power source for the aircraft from the first battery to the second, removable battery, wherein the second, removable battery has a larger capacity than the first battery and corresponds to a larger load than the unoccupied aircraft; and
after switching the power source, perform a vertical takeoff of the aircraft using the second, removable battery, wherein the aircraft is occupied by a passenger when the vertical takeoff is performed.

2. The system recited in claim 1, wherein the aircraft further includes one or more of the following: a seat, a compartment for an occupant to stand in, a cockpit, a bicycle-style seat, a backless seat, or a saddle.

3. The system recited in claim 1, wherein the aircraft further includes a seat and the second, removable battery is detachably coupled to the aircraft beneath the seat.

4. The system recited in claim 1, wherein the aircraft further includes a compartment for an occupant to stand in and the second, removable battery is detachably coupled to the aircraft above the compartment.

5. The system recited in claim 1, wherein:
the aircraft performs the vertical landing onto a docking station that enforces a single proper landing position for the aircraft; and
the second, removable battery is detachably coupled to the aircraft using the docking station.

6. The system recited in claim 1, wherein:
the aircraft performs the vertical landing onto a docking station that enforces a single proper landing position for the aircraft and has an inwardly sloping side; and
the second, removable battery is detachably coupled to the aircraft using the docking station.

7. The system recited in claim 1, wherein the second, removable battery includes two shoulder straps.

8. The system recited in claim 1, wherein the second, removable battery includes a telescoping handle and a plurality of wheels.

9. The system recited in claim 1, wherein the second, removable battery includes a male electrical plug with a retractable cord which is covered by a cap.

10. A method, comprising:
performing a vertical landing of an aircraft using a first battery, wherein:
the aircraft is unoccupied when the vertical landing is performed;
the unoccupied aircraft includes the first battery; and
the unoccupied aircraft excludes a second, removable battery;

detecting the second, removable battery being detachably coupled to the aircraft;

in response to detecting the second, removable battery being detachably coupled to the aircraft, switching a power source for the aircraft from the first battery to the second, removable battery, wherein the second, removable battery has a larger capacity than the first battery and corresponds to a larger load than the unoccupied aircraft; and after switching the power source, performing a vertical takeoff of the aircraft using the second, removable battery, wherein the aircraft is occupied by a passenger when the vertical takeoff is performed.

11. The method recited in claim 10, wherein the aircraft further includes one or more of the following: a seat, a compartment for an occupant to stand in, a cockpit, a bicycle-style seat, a backless seat, or a saddle.

12. The method recited in claim 10, wherein the aircraft further includes a seat and the second, removable battery is detachably coupled to the aircraft beneath the seat.

13. The method recited in claim 10, wherein the aircraft further includes a compartment for an occupant to stand in and the second, removable battery is detachably coupled to the aircraft above the compartment.

14. The method recited in claim 10, wherein:

performing the vertical landing includes landing onto a docking station that enforces a single proper landing position for the aircraft; and the second, removable battery is detachably coupled to the aircraft using the docking station.

15. The method recited in claim 10, wherein:

performing the vertical landing includes landing onto a docking station that enforces a single proper landing position for the aircraft and has an inwardly sloping side; and the second, removable battery is detachably coupled to the aircraft using the docking station.

16. The method recited in claim 10, wherein the second, removable battery includes two shoulder straps.

17. The method recited in claim 10, wherein the second, removable battery includes a telescoping handle and a plurality of wheels.

18. The method recited in claim 10, wherein the second, removable battery includes a male electrical plug with a retractable cord which is covered by a cap.

\* \* \* \* \*

UNITED STATES PATENT AND TRADEMARK OFFICE
CERTIFICATE OF CORRECTION

PATENT NO. : 10,703,480 B1
APPLICATION NO. : 16/418157
DATED : July 7, 2020
INVENTOR(S) : Sebastian Thrun and Damon Vander Lind It is certified that error appears in the above-identified patent and that said Letters Patent is hereby corrected as shown below:

In the Specification

In Column 21, Line(s) 28, before "$TRC_{3,n}$)", insert --$TRC_{3,n-1}$,-- therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*